(12) United States Patent
Yamaguchi et al.

(10) Patent No.: US 7,265,479 B2
(45) Date of Patent: Sep. 4, 2007

(54) POWER SUPPLY APPARATUS, AND IMAGE FORMING APPARATUS HAVING THE SAME

(75) Inventors: Atsuhiko Yamaguchi, Izu (JP); Hiroshi Mano, Numazu (JP); Osamu Nagasaki, Numazu (JP); Kouji Yasukawa, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 13 days.

(21) Appl. No.: 11/275,635

(22) Filed: Jan. 20, 2006

(65) Prior Publication Data

US 2006/0220495 A1 Oct. 5, 2006

(30) Foreign Application Priority Data

Mar. 31, 2005 (JP) ............................. 2005-104355
Jan. 12, 2006 (JP) ............................. 2006-005395

(51) Int. Cl.
*H01L 41/107* (2006.01)
(52) U.S. Cl. ...................................................... 310/318
(58) Field of Classification Search ................ 310/318, 310/359
See application file for complete search history.

(56) References Cited

U.S. PATENT DOCUMENTS

| 6,075,325 | A | * | 6/2000 | Kouno et al. ................ 315/307 |
| 6,107,620 | A | | 8/2000 | Shiba et al. ................. 250/214 |
| 6,229,721 | B1 | | 5/2001 | Mano et al. .................. 363/56 |
| 7,012,578 | B2 | * | 3/2006 | Nakatsuka et al. ........... 345/52 |
| 7,122,939 | B2 | * | 10/2006 | Chou et al. .................. 310/318 |
| 2006/0072255 | A1 | * | 4/2006 | Chou et al. ................... 361/35 |
| 2006/0222398 | A1 | | 10/2006 | Nagasaki et al. ............. 399/88 |
| 2006/0273688 | A1 | | 12/2006 | Yasukawa et al. ........... 310/318 |

FOREIGN PATENT DOCUMENTS

| JP | 52-9823 | * | 7/1975 | ................ 310/318 |
| JP | 6-242166 | | 9/1994 | |
| JP | 11-206113 | | 7/1997 | |
| JP | 10-12356 | | 1/1998 | |
| JP | 11-122914 | | 4/1999 | |
| JP | 2006-129673 | * | 5/2006 | |

* cited by examiner

*Primary Examiner*—Thomas M. Dougherty
(74) *Attorney, Agent, or Firm*—Fitzpatrick, Cella, Harper & Scinto

(57) ABSTRACT

In a power supply apparatus including a plurality of power supply circuits, each of the power supply circuits has a piezoelectric transformer, a rectification element which rectifies and smoothes a voltage output from the piezoelectric transformer in accordance with a load and outputs the voltage, a voltage-controlled oscillator which controls the frequency of an output signal in accordance with an input control signal, and a power supply voltage supply element which is driven by a signal output from the voltage-controlled oscillator and supplies a power supply voltage to the piezoelectric transformer. One power supply circuit includes a resonance frequency change unit which is connected to the output side of the piezoelectric transformer. The resonance frequency change unit drives the piezoelectric transformer of the power supply circuit at a driving frequency which is different from the driving frequency of the piezoelectric transformer in another power supply circuit by shifting the peak of the resonance frequency.

10 Claims, 24 Drawing Sheets

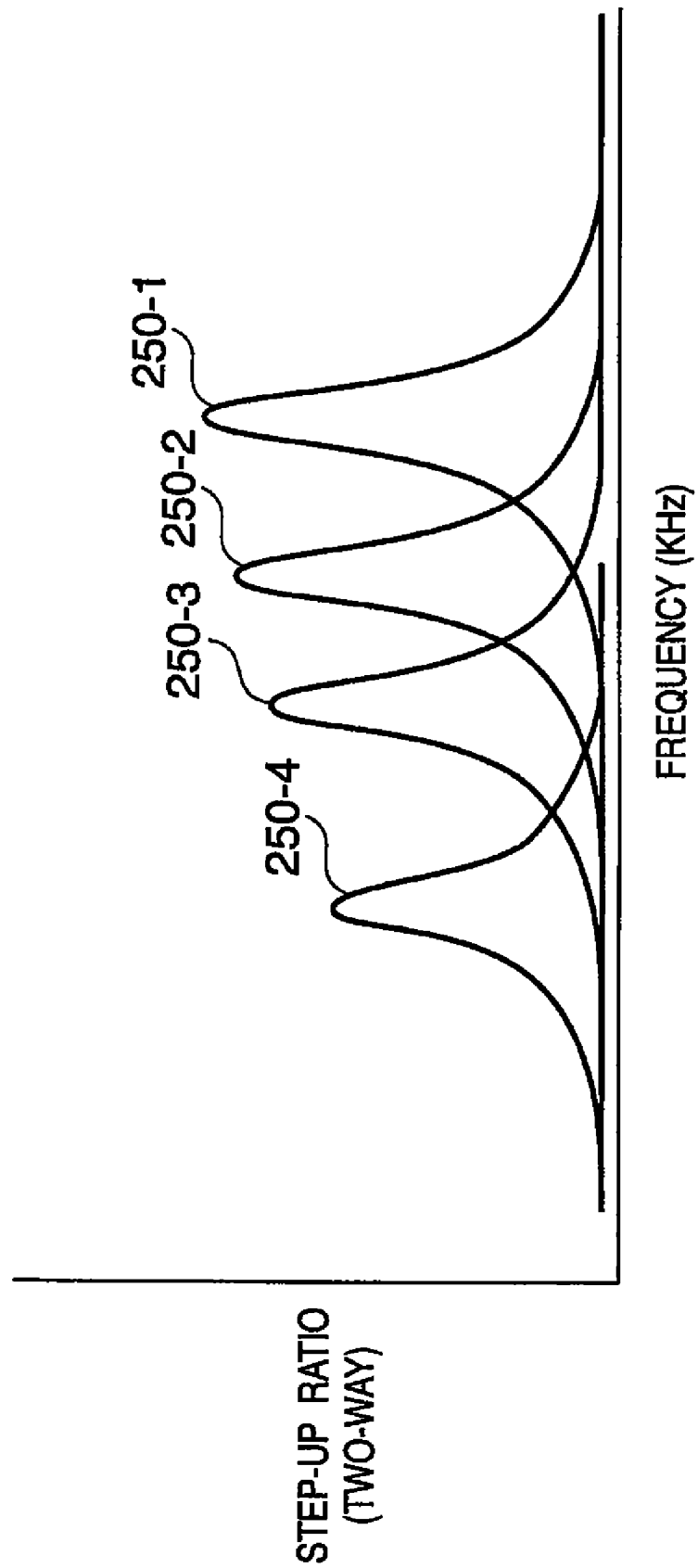

FIG. 3C

| CAPACITANCE OF CAPACITOR 117a (pF) | MAXIMUM OUTPUT FREQUENCY (KHz) | STEP-UP RATIO (TWO-WAY) |
|---|---|---|
| 3 | 157.3 | 225 |
| 5 | 153.2 | 220 |
| 7 | 151.9 | 200 |
| 10 | 150.3 | 180 |

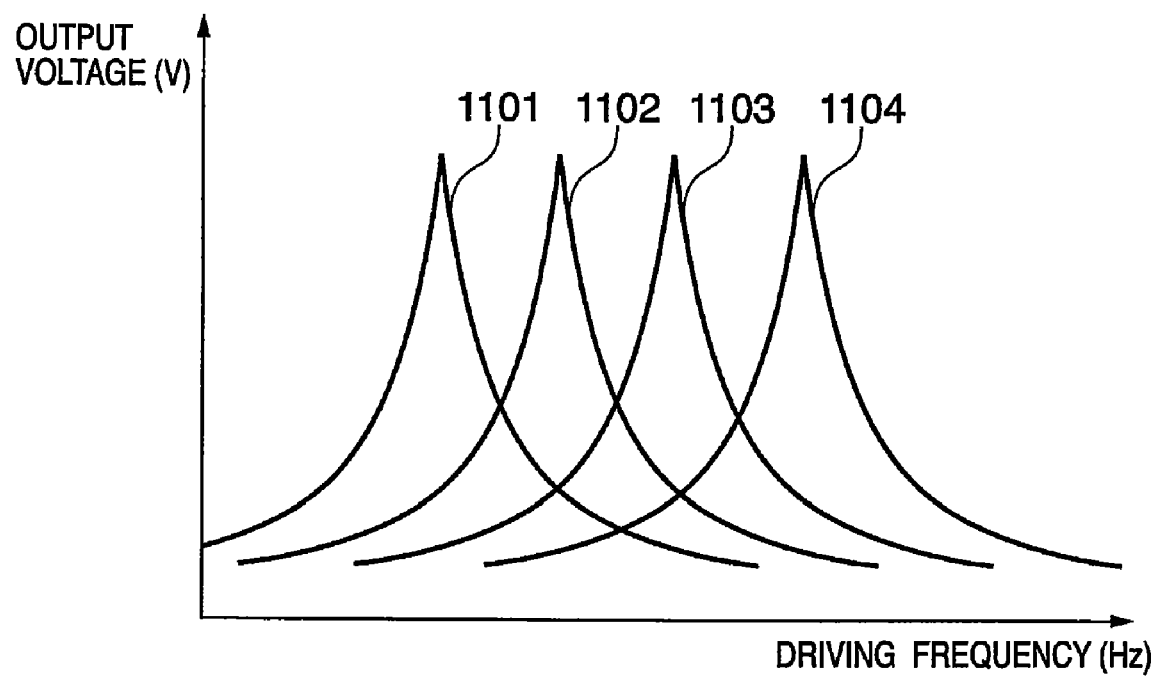

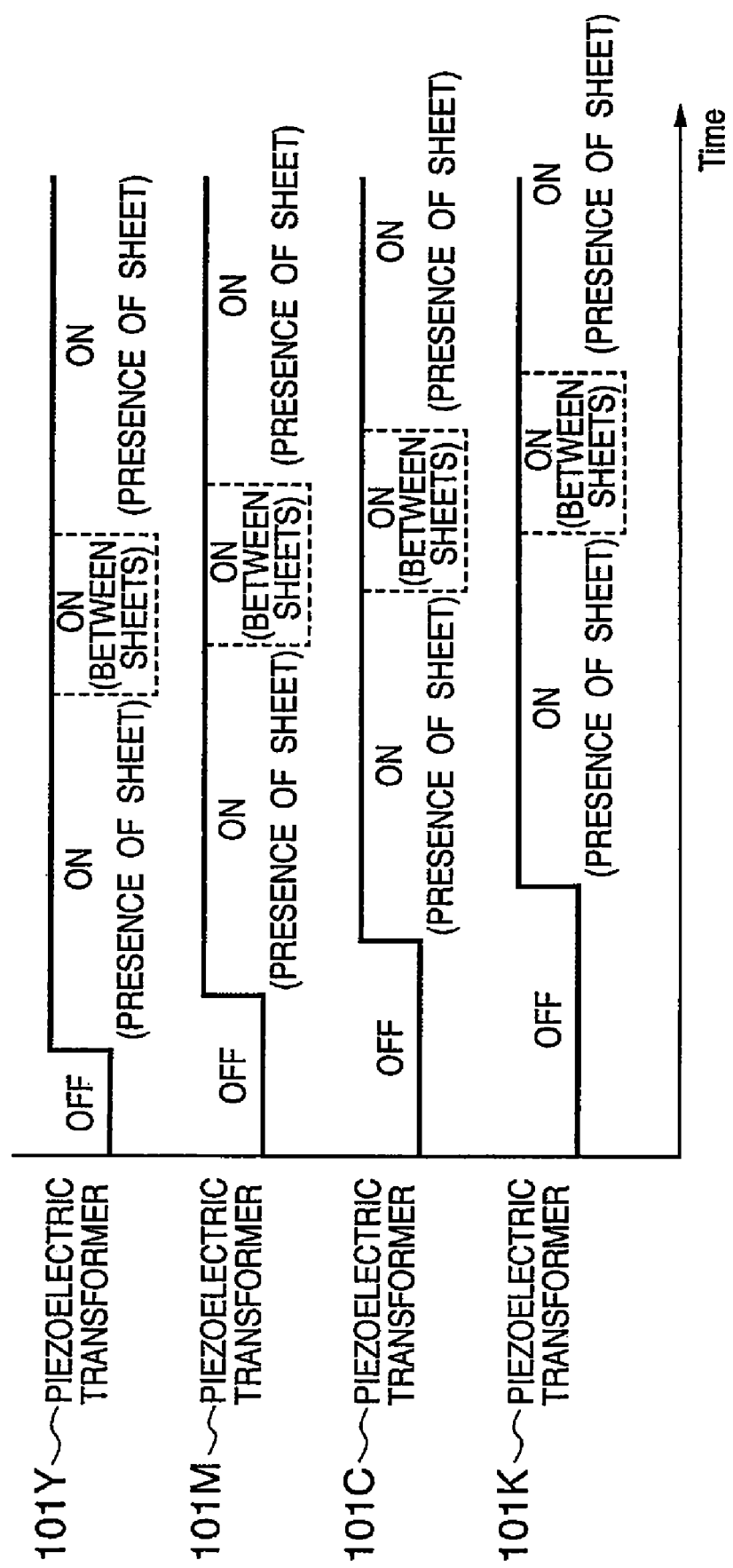

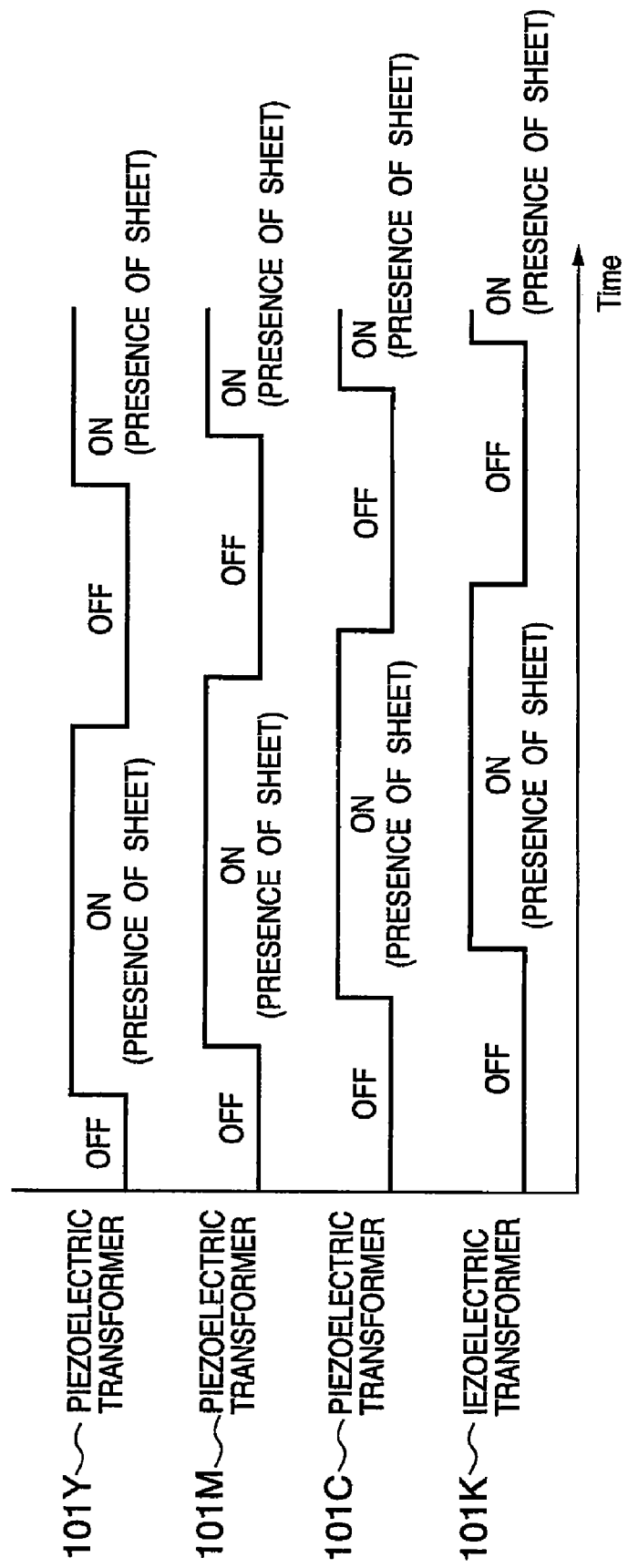

POWER SUPPLY APPARATUS, AND IMAGE FORMING APPARATUS HAVING THE SAME

FIELD OF THE INVENTION

The present invention relates to a power supply apparatus suitable for an image forming apparatus which forms an image by an electrophotographic process and, more particularly, to a power supply apparatus using a piezoelectric transformer and an image forming apparatus using the power supply apparatus.

BACKGROUND OF THE INVENTION

When an image forming apparatus which forms an image by an electrophotographic process adopts a direct transfer system of transferring an image by bringing a transfer member into contact with a photoconductor, the transfer member uses a conductive rubber roller having a conductive rotating shaft. Driving of the transfer member is controlled to match the process speed of the photoconductor.

A voltage applied to the transfer member is a DC bias voltage. At this time, the polarity of the DC bias voltage is identical to that of a transfer voltage for general corona discharge. To achieve satisfactory transfer using the transfer roller, a voltage of generally 3 kV or more (required current is several μA) must be applied to the transfer roller. This high voltage necessary for the above image forming process is conventionally generated using a wire-wound electromagnetic transformer. The electromagnetic transformer is made up of a copper wire, bobbin, and core. When the electromagnetic transformer is used in application of a voltage of 3 kV or more, the leakage current must be minimized at each portion because the output current value is as small as several μA. For this purpose, the windings of the transformer must be molded with an insulator, and the transformer must be made large in comparison with supply power. This inhibits downsizing and weight reduction of a high-voltage power supply apparatus.

In order to compensate for these drawbacks, it is examined to generate a high voltage by using a flat, light-weight, high-output piezoelectric transformer. By using a piezoelectric transformer formed from ceramic, the piezoelectric transformer can generate a high voltage at higher efficiency than that of the electromagnetic transformer. Since electrodes on the primary and secondary sides can be spaced apart from each other regardless of coupling between the primary and secondary sides, no special molding is necessary for insulation. The piezoelectric transformer brings an advantage of making a high-voltage generation apparatus compact and lightweight.

An example of the high-voltage generation apparatus by using the piezoelectric transformer is disclosed in, e.g., Japanese Patent Application Laid-Open No. 11-206113.

A conventional high-voltage power supply circuit using a piezoelectric transformer will be explained with reference to FIG. 6. In FIG. 6, reference numeral 101Y denotes a piezoelectric transformer (piezoelectric ceramic transformer) for a high-voltage power supply. An output from the piezoelectric transformer 101Y is rectified and smoothed to a positive voltage by diodes 102Y and 103Y and a high-voltage capacitor 104Y, and supplied to a transfer roller (not shown) serving as a load. The output voltage is divided by resistors 105Y, 106Y, and 107Y, and input to the inverting input terminal (negative terminal) of an operational amplifier 109Y via a protection resistor 108Y. The non-inverting input terminal (positive terminal) of the operational amplifier receives, via a resistor 114Y, a high-voltage power supply control signal (Vcont) which serves as an analog signal and is input to a connection terminal 118Y from a DC controller 201. The operational amplifier 109Y, the resistor 114Y, and a capacitor 113Y construct an integrating circuit. The control signal (Vcont) smoothed by an integral time constant determined by the component constants of the resistor and capacitor is input to the operational amplifier 109Y. The output terminal of the operational amplifier 109Y is connected to a voltage-controlled oscillator (VCO) 110Y. A transistor 111Y whose output terminal is connected to an inductor 112Y is driven to supply power to the primary side of the piezoelectric transformer.

The high-voltage power supply unit of an electrophotographic image forming apparatus comprises a plurality of high-voltage power supply circuits (corresponding to image forming units for, e.g., yellow (Y), magenta (M), cyan (C), and black (K)) using the piezoelectric transformer shown in FIG. 6. The high-voltage power supply unit outputs biases for charging, development, transfer, and the like.

In the above example, pluralities of piezoelectric transformers and control circuits are arranged in the high-voltage power supply unit, and a plurality of bias voltages are output to form images. Especially a high-voltage power supply unit mounted in a color image forming apparatus of a tandem system requires four bias output circuits for charging, development, transfer, and the like in correspondence with formation of cyan, magenta, yellow, and black images. The circuits corresponding to cyan (C), magenta (M), yellow (Y), and black (K) colors are controlled at almost the same bias output voltages. Piezoelectric transformers mounted in the high-voltage power supply unit are driven at almost the same frequencies (close frequencies) in the respective bias output circuits (C, M, Y, and K) for charging, development, transfer, and the like.

In this manner, a plurality of piezoelectric transformers are driven at close frequencies to output the same bias voltages. In this case, adjacent piezoelectric transformers interfere with each other via the power supply line or depending on electrostatic capacitive coupling or the like, which makes it difficult to improve the output precision of a high bias voltage. Alternatively, the image quality may degrade due to, e.g., generation of fluctuations of a high bias voltage by the interference frequency.

In order to avoid the influence on an image depending on the precision of a high bias voltage, piezoelectric transformers are arranged at a large interval. In order to suppress interference via the power supply line, the pattern length is increased or the capacitance of a decoupling capacitor is increased in designing the pattern of the power supply line. However, it is difficult to take these measures by theoretical calculation. In a case where problems are solved by many experiments, it is necessary to determine concrete measures by the many experiments. This prolongs the period of product development. Even if the problems are solvable, the high-voltage power supply unit can hardly achieve downsizing and a high image quality at the same time.

SUMMARY OF THE INVENTION

The present invention has been proposed to solve the conventional problems, and has as its object to provide a power supply apparatus using piezoelectric transformers which can suppress the interference between the driving frequencies of the piezoelectric transformers and implement downsizing and a high image quality.

It is another object of the present invention to provide an image forming apparatus having the power supply apparatus.

To achieve the above objects, the power supply apparatus and image forming apparatus according to the present invention are mainly characterized by comprising the following arrangements.

According to one aspect of the present invention, a power supply apparatus comprising a plurality of power supply circuits, each of the power supply circuits having a piezoelectric transformer, and a voltage-controlled oscillator which generates a signal having a driving frequency of the piezoelectric transformer in accordance with a control signal, wherein when voltages to be supplied from at least one power supply circuit and another power supply circuit are output, the voltage-controlled oscillator of the one power supply circuit generates a signal of a frequency which is not close to a frequency of a signal output from the voltage-controlled oscillator of the another power supply circuit.

According to another aspect of the present invention, an image forming apparatus having a plurality of color stations for forming images in colors different from each other, comprising a plurality of high-voltage power supply circuits each having a piezoelectric transformer in order to output a high voltage to be used by each color station, wherein at least two piezoelectric transformers for outputting high voltages to at least two color stations are driven at driving frequencies not close to each other.

Other features and advantages of the present invention will be apparent from the following descriptions taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 3A is a graph showing the relationship between the frequency and the step-up ratio to capacitive loads connected to the output terminals of the piezoelectric transformers 101Y and 101M;

FIG. 3C is a table showing the relationship between the maximum output frequency and the step-up ratio to the capacitance of a capacitor 117a;

FIG. 11 is a graph showing the relationship between the driving frequency and output voltage of a circuit when the electrostatic capacitance is changed;

FIG. 12A is a timing chart showing the timing of high-voltage charging operation when an image is formed by an image forming apparatus according to the fifth embodiment;

FIG. 12B is a timing chart showing the timing of high-voltage charging operation when an image is formed by the image forming apparatus according to the fifth embodiment;

DETAILED DESCRIPTION OF THE PREFERRED EMBODIMENTS

Preferred embodiments of the present invention will now be described in detail in accordance with the accompanying drawings.

First Embodiment

Figure 2:
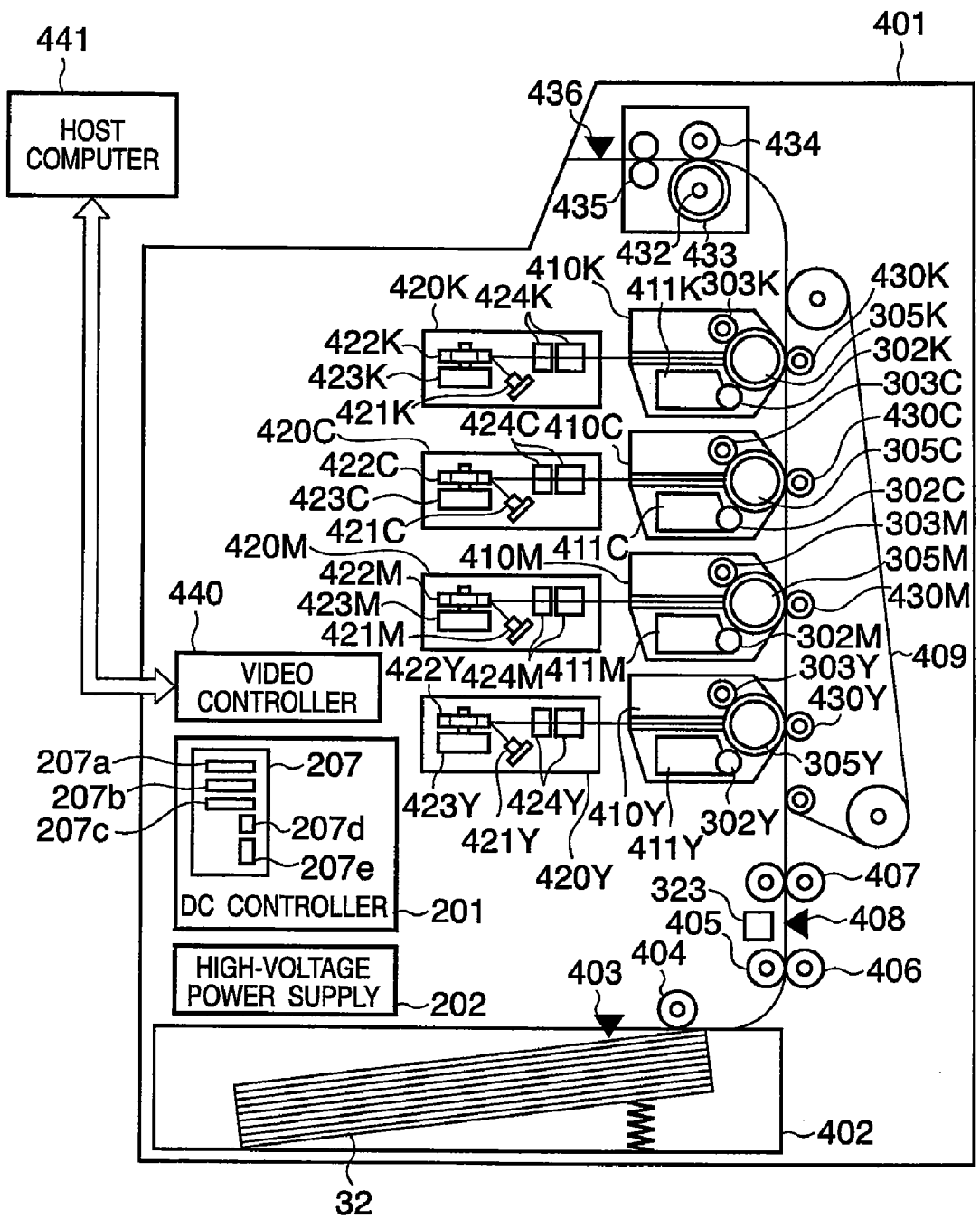
FIG. 2 is a view showing the arrangement of an image forming apparatus having a high-voltage power supply apparatus using a piezoelectric transformer.

The first embodiment of the present invention will be described below with reference to the accompanying drawings. FIG. 2 is a view showing an image forming apparatus (to be referred to as a "color laser printer" hereinafter) having a high-voltage power supply apparatus 202 using a piezoelectric transformer. A color laser printer 401 comprises a deck 402 which stores print sheets 32, and a deck sheet presence/absence sensor 403 which detects the presence/absence of the print sheets 32 in the deck 402. The color laser printer 401 also comprises a pickup roller 404 which picks up the print sheet 32 from the deck 402, and a deck sheet feed roller 405 which conveys the print sheet 32 picked up by the pickup roller 404. The color laser printer 401 further comprises a retard roller 406 which is paired with the deck sheet feed roller 405 and prevents multi-feed of the print sheets 32.

A registration roller pair 407 which synchronously conveys the print sheet 32, and a pre-registration sensor 408 which detects conveyance of the print sheet 32 to the registration roller pair 407 are arranged downstream of the deck sheet feed roller 405. An electrostatic chuck/convey/transfer belt (to be referred to as "ETB" hereinafter) 409 is arranged downstream of the registration roller pair 407. Images are formed on the ETB 409 by image forming units made up of process cartridges 410Y, 410M, 410C, and 410K and scanner units 420Y, 420M, 420C, and 420K for four colors (Y, M, C, and K). The formed images are sequentially superposed on each other by transfer rollers 430Y, 430M, 430C, and 430K to form a color image. The color image is transferred and conveyed on the print sheet 32.

A pair of a pressurizing roller 434 and a fixing roller 433 which incorporates a heater 432 in order to thermally fix a toner image transferred on the print sheet 32 are arranged on the downstream side. Further, a fixing/discharge roller pair 435 which conveys the print sheet 32 from the fixing roller, and a fixing/discharge sensor 436 which detects conveyance from the fixing unit are arranged.

Each scanner unit 420 comprises a laser unit 421, and a polygon mirror 422, scanner motor 423, and imaging lens group 424 for scanning each photosensitive drum 305 with a laser beam from the laser unit 421. A laser beam emitted by the laser unit 421 is modulated on the basis of an image signal sent from a video controller 440.

Each process cartridge 410 comprises the photosensitive drum 305, a charging roller 303, a development roller 302, and a toner storage vessel 411 which are necessary for a known electrophotographic process. The process cartridge 410 is detachable from the color laser printer 401.

The video controller 440 receives image data sent from an external device 441 such as a personal computer (host computer), and bitmaps the image data into bitmap data to generate an image signal for forming an image.

Reference numeral 201 denotes a DC controller serving as the control unit of the laser printer. The DC controller 201 is configured by an MPU (microcomputer) 207, various input/output control circuits (not shown), and the like. The MPU 207 has a RAM 207a, ROM 207b, timer 207c, digital input/output port 207d, and D/A port 207e.

The high-voltage power supply unit (high-voltage power supply apparatus) 202 is comprised of a charging high-voltage power supply (not shown) and development high-voltage power supply (not shown) which correspond to each process cartridge 410 (Y, M, C, or K), and a transfer high-voltage power supply which corresponds to each transfer roller 430 and uses a piezoelectric transformer capable of outputting a high voltage.

The arrangement of the transfer high-voltage power supply using the piezoelectric transformer will be explained with reference to FIG. 1A. The arrangement of the transfer high-voltage power supply (to be also simply referred to as a "transfer high-voltage power supply" hereinafter) using the piezoelectric transformer according to the first embodiment is effective for both positive- and negative-voltage output circuits. A transfer high-voltage power supply which typically requires a positive voltage will be explained.

The transfer high-voltage power supply includes four circuits in correspondence with the transfer rollers 430Y, 430M, 430C, and 430K for yellow (Y), magenta (M), cyan (C), and black (K). These circuits have the same circuit arrangement, and FIG. 1A illustrates two typical circuits for yellow (Y) and magenta (M) (the reference numeral representing each circuit is suffixed with Y or M for discrimination). However, the gist of the present invention is not limited to these two circuits, and can also be applied to the arrangement of a transfer high-voltage power supply having four or more circuits.

The image forming apparatus has a plurality of color stations for forming images in colors different from each other. The image forming apparatus comprises a plurality of high-voltage power supply circuits each having a piezoelectric transformer in order to output a high voltage to be used by each color station. The image forming apparatus is characterized in that at least two piezoelectric transformers for outputting high voltages to at least two color stations are driven at driving frequencies not close to each other.

Figure 1A:
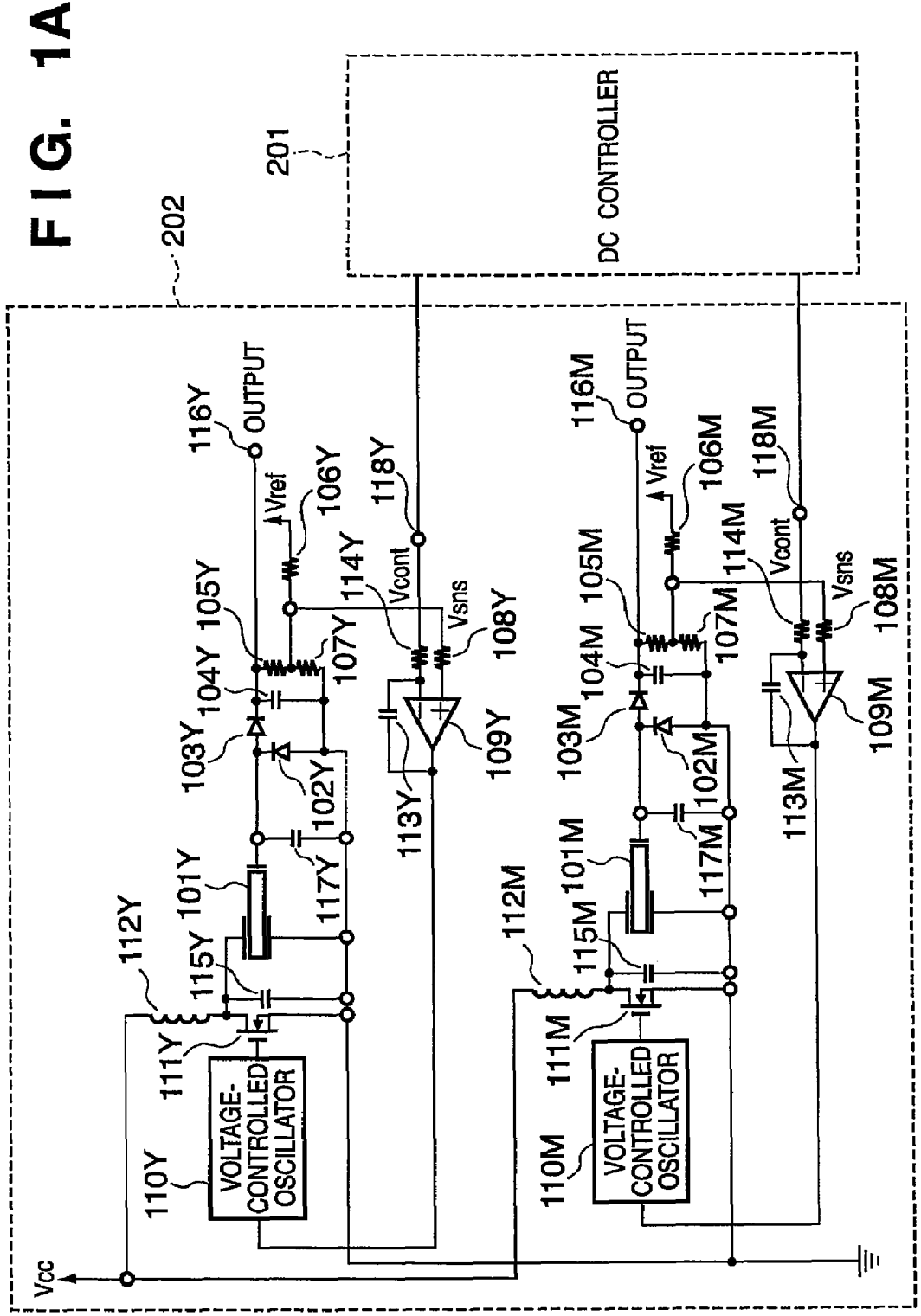
FIG. 1A is a circuit diagram showing the circuit arrangement of a transfer high-voltage power supply using a piezoelectric transformer according to the first embodiment.

In FIG. 1A, reference numeral 101Y denotes a piezoelectric transformer (piezoelectric ceramic transformer) for a high-voltage power supply. An output from the piezoelectric transformer 101Y is rectified and smoothed to a positive voltage by diodes 102Y and 103Y and a high-voltage capacitor 104Y, and supplied from an output terminal 116Y to a transfer roller (not shown) serving as a load. The output voltage is divided by resistors 105Y, 106Y, and 107Y, and input to the non-inverting input terminal (positive terminal) of an operational amplifier 109Y via a protection resistor 108Y. The inverting input terminal (negative terminal) of the operational amplifier receives, via a series resistor 114Y, a high-voltage power supply control signal (Vcont) which serves as an analog signal from the DC controller 201 and is input from a connection terminal 118Y.

The output terminal of the operational amplifier 109Y is connected to a voltage-controlled oscillator (VCO) 110Y. The output terminal of the voltage-controlled oscillator 110Y is connected to the gate of a field effect transistor 111Y. The drain of the field effect transistor 111Y is connected to a power supply (+24 V: Vcc) via an inductor 112Y, grounded via a capacitor 115Y, and connected to one electrode of the piezoelectric transformer 101Y on the primary side. The other electrode on the primary side is grounded. The source of the field effect transistor 111Y is also grounded.

Figure 8:
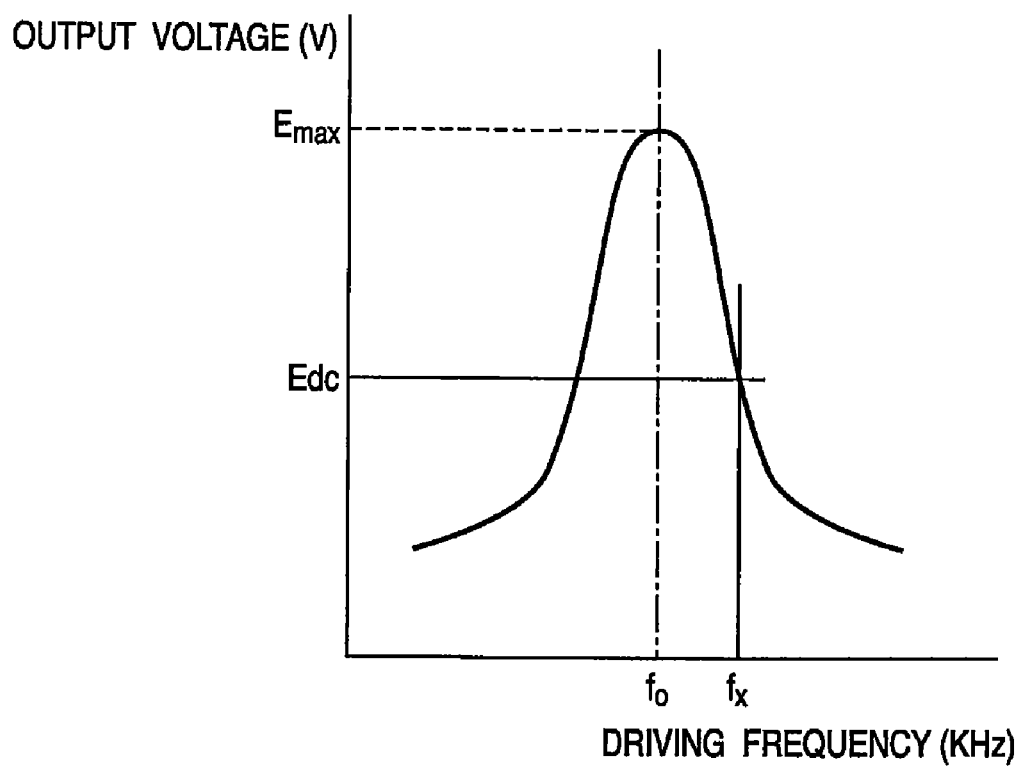
FIG. 8 is a graph showing the relationship between the output voltage (V) and the driving frequency (Hz) as a characteristic of the piezoelectric transformer.

FIG. 8 is a graph showing the relationship between the output voltage (V) and the driving frequency (Hz) as a characteristic of the piezoelectric transformer. As a characteristic of the piezoelectric transformer, the output voltage generally reaches a maximum voltage (Emax) at a resonance frequency $f_0$ as shown in FIG. 8. At a driving frequency fx, the piezoelectric transformer outputs a specified output voltage (to be also referred to as a "control output voltage" hereinafter) Edc. The distribution of the output voltage (V) forms a bell shape using, as the center, the resonance frequency (to be also referred to as a "maximum frequency" hereinafter) $f_0$. By changing the driving frequency, the output voltage can be controlled. For example, to increase the output voltage of the piezoelectric transformer, the driving frequency is changed from a higher driving frequency to a lower one toward the resonance frequency $f_0$. In the following description, control is done at a frequency higher than the resonance frequency $f_0$. The same concept applies to control at a lower frequency.

The voltage-controlled oscillator (VCO) 110Y operates to increase the output frequency when the input voltage rises, and decrease it when the input voltage drops. When the control output voltage (Edc) of the piezoelectric transformer 101Y rises, an input voltage (Vsns) at the non-inverting input terminal (positive terminal) of the operational amplifier 109Y rises via the resistor 105Y, and the voltage at the output terminal of the operational amplifier 109Y rises. Since the input voltage of the voltage-controlled oscillator 110Y rises, its output frequency increases, and the driving frequency of the piezoelectric transformer 101Y also increases. Hence, the piezoelectric transformer 101Y is driven at a frequency higher than the driving frequency fx. Since the output voltage of the piezoelectric transformer 101Y drops as the driving frequency fx increases, the output voltage is controlled to a lower one. That is, the arrangement in FIG. 1A forms a negative feedback control circuit.

When the control output voltage (Edc) of the piezoelectric transformer 101Y drops, the input voltage (Vsns) of the operational amplifier 109Y also drops, and the voltage at the output terminal of the operational amplifier 109Y drops. Since the input voltage of the voltage-controlled oscillator 110Y drops, its output frequency decreases, and the driving frequency of the piezoelectric transformer 101Y also decreases. Since the output voltage of the piezoelectric transformer 101Y rises as the driving frequency fx decreases, the output voltage is controlled to a higher one.

In this fashion, the output voltage is controlled to a constant voltage so as to be equal to a voltage determined by the voltage of the control signal (Vcont) which is input from the DC controller 201 to the inverting input terminal (negative terminal) of the operational amplifier 109Y.

Figure 3B:
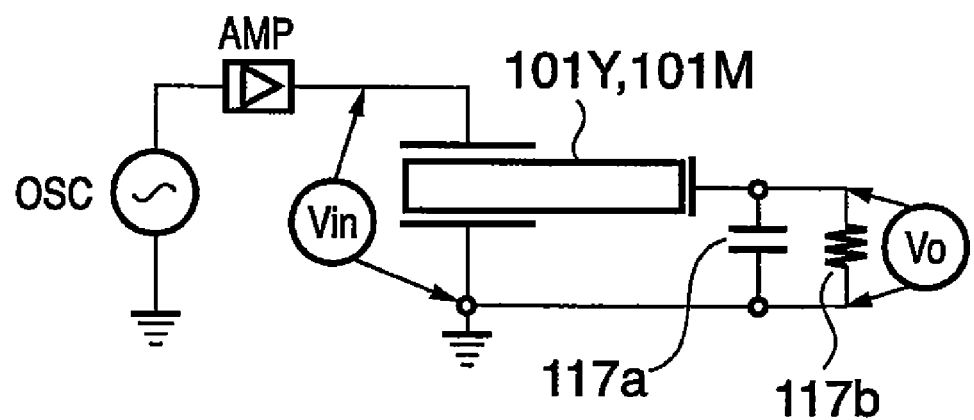
FIG. 3B is a circuit diagram showing the schematic arrangement of a measurement circuit for measuring the relationship between the frequency and the step-up ratio to the capacitive load.

In printing operation corresponding to the four, yellow (Y), magenta (M), cyan (C), and black (K) colors, high-voltage circuits, i.e., piezoelectric transformers operate at almost the same timings in correspondence with the four, Y, M, C, and K colors. In order to explain a feature of the first embodiment, the operation of two circuits for yellow (Y) and magenta (M) will be explained. Assume that capacitors 117Y and 117M different in capacitance are respectively connected to the output terminals of the piezoelectric transformer 101Y and a piezoelectric transformer 101M. FIG. 3A shows the relationship between the frequency and the step-up ratio in association with capacitive loads connected to the output terminals of the piezoelectric transformers 101Y and 101M. FIG. 3B shows the schematic arrangement of a measurement circuit for measuring the relationship between the frequency and the step-up ratio to the capacitive load.

As shown in FIG. 3B, a signal from an oscillator (OSC) is amplified by an amplifier (AMP), and input to the piezoelectric transformer 101(Y,M). A capacitive load 117a (e.g., capacitor) and a voltage measurement load resistor 117b are connected to the output terminal of the piezoelectric transformer 101(Y,M). The measurement circuit uses a voltmeter to measure an input voltage Vin and output voltage Vo of the piezoelectric transformer. The measurement circuit calculates the step-up ratio from the relationship Vo/Vin.

FIG. 3A is a graph showing the relationship between the frequency and the step-up ratio to the capacitive load. A curve 250-1 represents a case wherein the capacitance of the capacitor 117a is 3 pF. A curve 250-2 represents a case wherein the capacitance of the capacitor 117a is 5 pF. A curve 250-3 represents a case wherein the capacitance of the capacitor 117a is 7 pF. A curve 250-4 represents a case wherein the capacitance of the capacitor 117a is 10 pF. As the capacitance of the capacitor connected to the output terminal of the piezoelectric transformer 101(Y,M) increases, the maximum output frequency shifts to the low-frequency side, and the step-up ratio decreases. This measurement uses a suitable load resistor 117b of 40 MΩ. In this case, the maximum output frequency and step-up ratio to the capacitance of the capacitor 117a of the piezoelectric transformer 101(Y,M) are shown in FIG. 3C.

Figure 6:
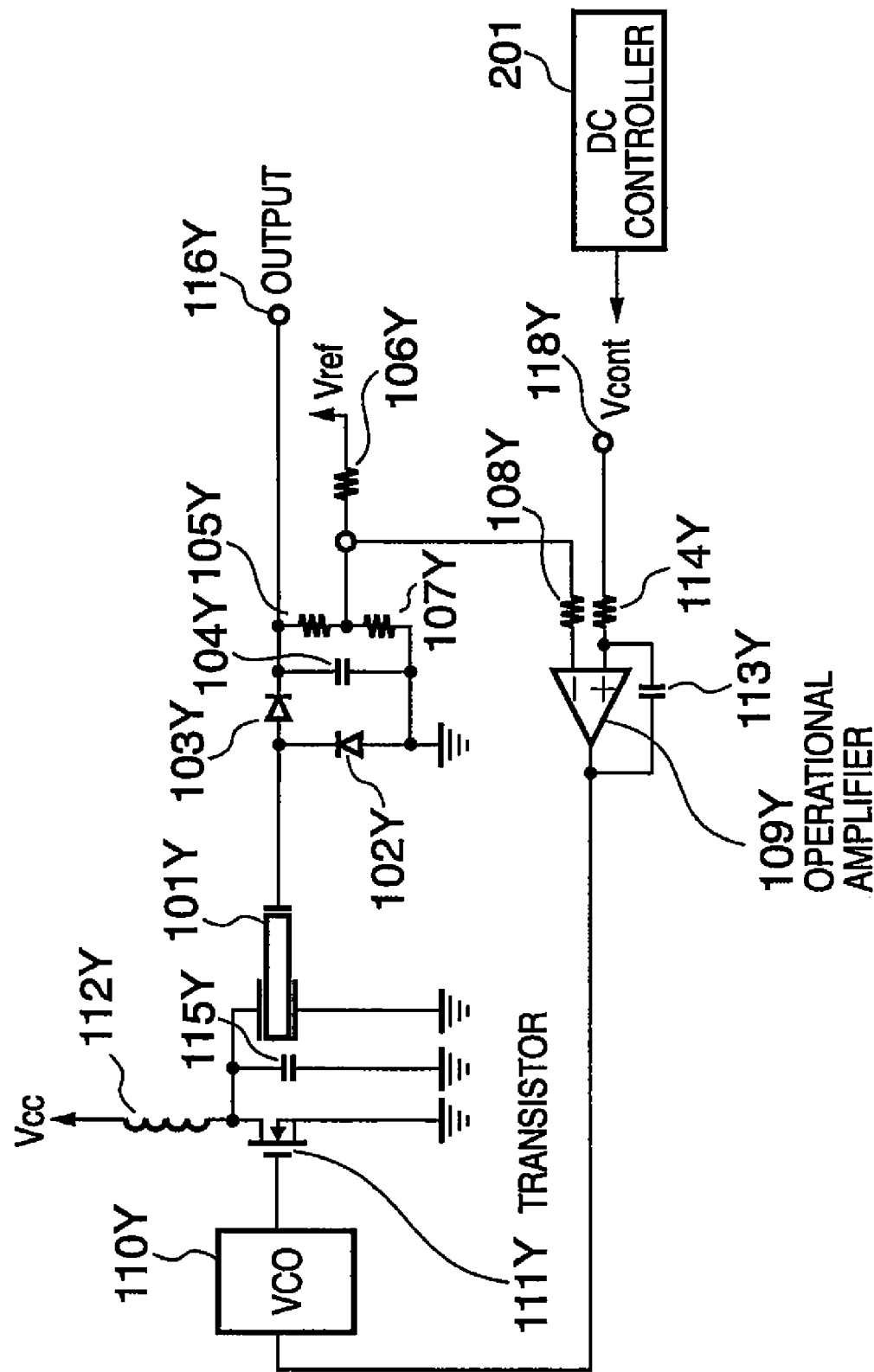
FIG. 6 is a circuit diagram showing a conventional high-voltage power supply circuit using a piezoelectric transformer.
Figure 7A:
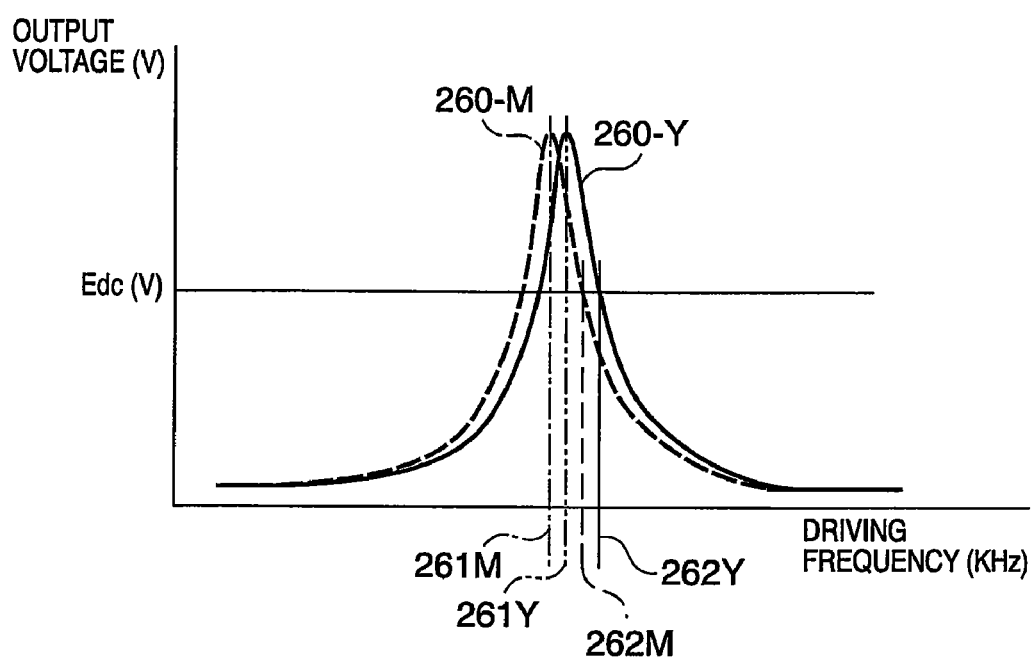
FIG. 7A is a graph showing the relationship between the driving frequency and output voltage of the piezoelectric transformer of a high-voltage power supply when yellow (Y) and magenta (M) images are formed by the circuit arrangement in FIG. 6.

The operation and frequency characteristic of the circuit (FIG. 6) according to the prior art and those of the circuit (FIG. 1A) according to the first embodiment will be compared and explained. FIG. 7A is a graph showing the relationship (frequency characteristic) between the driving frequency and output voltage of the piezoelectric transformer of the high-voltage power supply when yellow (Y) and magenta (M) images are formed by the circuit arrangement of the prior art (FIG. 6). In FIG. 7A, 260-Y represents the frequency characteristic of a piezoelectric transformer used for a Y transfer bias output high-voltage power supply. In this case, a frequency for applying a maximum output voltage is 261Y, and a driving frequency corresponding to the control output voltage (Edc) is 262Y.

Figure 7B:
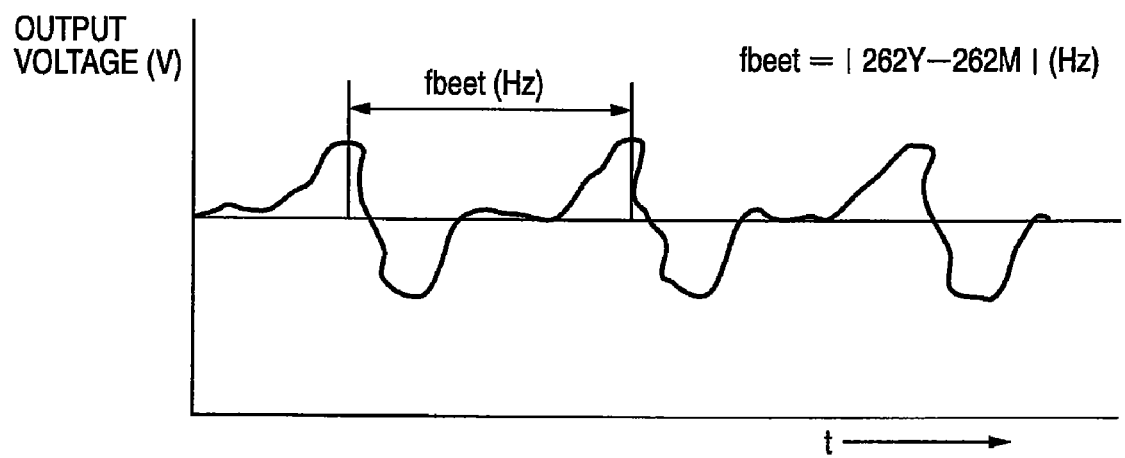
FIG. 7B is a timing chart for explaining a ripple voltage.

Also, 260-M represents the frequency characteristic of a piezoelectric transformer used for an M transfer bias output high-voltage power supply. In this case, a frequency for applying a maximum output voltage is 261M, and a driving frequency corresponding to the control output voltage (Edc) is 262M. Generally when the same control output voltage (Edc) (V) is output, the driving frequency is not completely the same due to individual variations of a piezoelectric transformer used. Each piezoelectric transformer is driven with a frequency difference of several ten Hz to several hundred Hz. When piezoelectric transformers having close driving frequencies are arranged close to each other, circuits which drive the piezoelectric transformers 101Y and 101M influence each other via the power supply line pattern. That is, the circuit which drives the piezoelectric transformer 101Y used for the Y transfer bias output high-voltage power supply, and the circuit which drives the piezoelectric transformer 101M used for the M transfer bias output high-voltage power supply influence each other. Since the piezoelectric transformers (101M and 101Y) are electrostatically capacitively coupled to each other, their driving frequencies influence each other and interfere with each other. As a result, a ripple voltage at the interference frequency appears in the output voltage as shown in FIG. 7B. The inference frequency represents the difference between the driving frequencies of the piezoelectric transformers. In FIG. 7A, the interference frequency is given as the absolute value of the driving frequency difference corresponding to the control output voltage (Edc):

$$f\text{beet} = |262Y - 262M| \text{ (Hz)} \quad (1)$$

The ripple voltage frequency fbeet (Hz) generated by interference changes the transfer efficiency between yellow (Y) and magenta (M). This influence appears as a visually recognized cycle in an image in accordance with the relationship between the ripple voltage frequency fbeet and the process speed (PS mm/S) of the image forming apparatus, and may degrade the image quality.

An interference image cycle Tb (mm) which may appear in an image in accordance with the process speed PS (mm/S) and the ripple voltage frequency fbeet (Hz) generated by interference is given by $$Tb = PS/f\text{beet} \text{ (mm)} \quad (2)$$

It is generally said that the interference image cycle Tb (mm) can be visually recognized when it becomes 0.3 mm or more. The interference image cycle is a cause of decreasing the quality of a printed image. For example, the interference image cycle can be visually recognized when the process speed PS is 100 mm/S and the ripple voltage frequency fbeet (Hz) generated by interference is about 350 Hz or less.

In the circuit arrangement shown in FIG. 1A, the 3-pF capacitive element (capacitor) 117Y is connected between ground and the output terminal of the piezoelectric transformer 101Y, and the 7-pF capacitor 117M is connected between ground and the output terminal of the piezoelectric transformer 101M. The capacitances of the capacitors are merely examples, and a preferable circuit arrangement can be provided when the yellow capacitor 117Y and magenta capacitor 117M have different capacitances.

Note that the same effects can be obtained even when no capacitive element (capacitor) is connected between ground and the output terminal of the piezoelectric transformer in a circuit arrangement corresponding to either yellow (Y) or magenta (M) image formation.

Figure 1B:
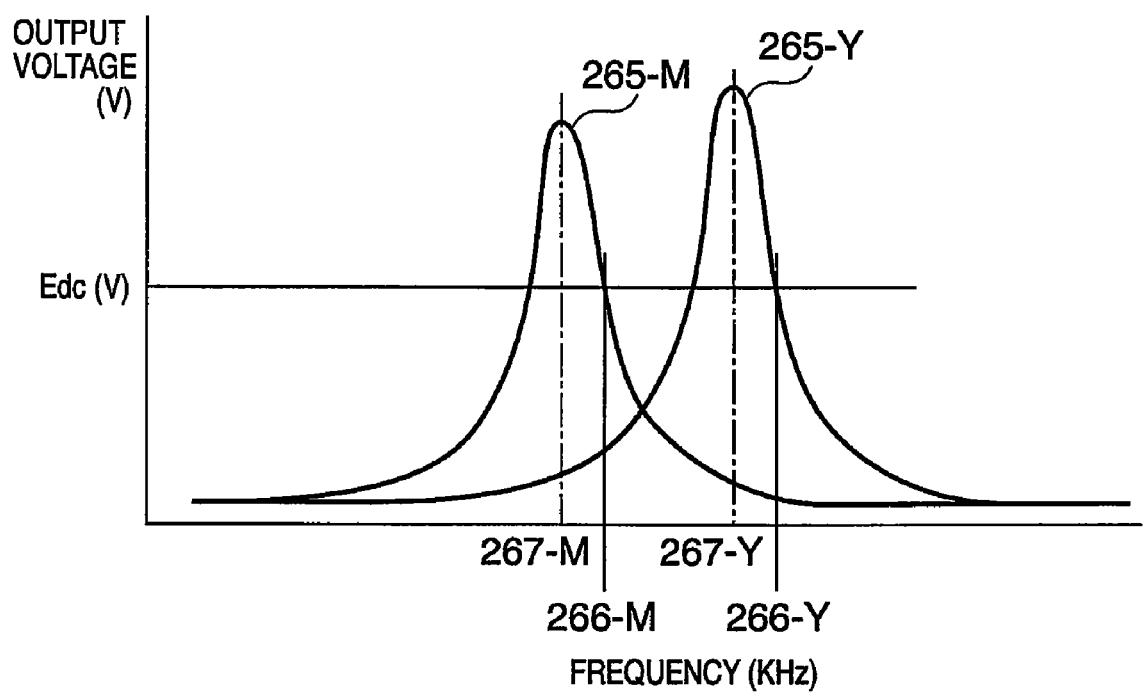
FIG. 1B is a graph showing the relationship between the driving frequencies and output voltages of piezoelectric transformers 101Y and 101M according to the first embodiment.

FIG. 1B is a graph showing the relationship (frequency characteristic) between the driving frequencies and output voltages of the piezoelectric transformers 101Y and 101M of the high-voltage power supply when yellow (Y) and magenta (M) images are formed by the circuit arrangement in FIG. 1A.

In the circuit arrangement of FIG. 1A, the 3-pF capacitor is connected between ground and the output terminal of the piezoelectric transformer 101Y, and the 7-pF capacitor is connected between ground and the output terminal of the piezoelectric transformer 101M. The relationship between the maximum output voltage, the frequency, and the step-up ratio to the capacitances of the capacitors connected between ground and the output terminals of the piezoelectric transformers 101Y and 101M is shown in FIGS. 3A and 3C. In FIG. 1B, 265-Y represents the frequency characteristic of the piezoelectric transformer used for the Y transfer bias output high-voltage power supply. In this case, a frequency for applying a maximum output voltage is 267-Y, and a driving frequency corresponding to the control output voltage (Edc) is 266-Y.

Also, 265-M represents the frequency characteristic of the piezoelectric transformer used for the M transfer bias output high-voltage power supply. In this case, a frequency (maximum output frequency) for applying a maximum output voltage is 267-M, and a driving frequency corresponding to the control output voltage (Edc) is 266-M.

The maximum output frequency 267-Y is 157.3 kHz (see a 3-pF capacitor in FIG. 3C), and the maximum output frequency 267-M is 151.9 kHz (see a 7-pF capacitor in FIG. 3C). The difference between the maximum output frequencies is 5.4 kHz.

The driving frequencies corresponding to the control output voltage (Edc) (V) are 266-Y=158.3 kHz and 266-M=152.9 kHz. The difference between the driving frequencies is 5.4 kHz which is equal to the difference between the maximum output frequencies.

The ripple voltage frequency fbeet (Hz) which may be generated by interference in the first embodiment is 5.4 kHz. For the process speed PS=100 mm/S, the interference image cycle Tb is given from the relation of equation (2):

$$Tb = PS/f\text{beet} = 100/5400 = 0.018 \text{ (mm)} \quad (3)$$

Since an interference image cycle of 0.3 mm or more can be visually recognized, the interference image cycle Tb of 0.018 mm is a pitch which cannot be visually recognized.

Even when the piezoelectric transformers are capacitively coupled, the influence of interference (voltage generated by interference) can be avoided because the piezoelectric transformers 101Y and 101M have different resonance frequencies. By connecting capacitors different in capacitance between ground and the output terminals of the adjacent piezoelectric transformers 101Y and 101M, the distribution of the frequency characteristic can be shifted to prevent the resonance frequencies of the piezoelectric transformers 101Y and 101M from coming close to each other. The shift of the distribution of the frequency characteristic can preclude the influence (generation of a voltage by interference) of mutual interference between piezoelectric transformers depending on the power supply pattern or mutual interference between piezoelectric transformers due to electrostatic capacitive coupling.

The bias voltage can be stabilized by avoiding the influence of mutual interference, and piezoelectric transformers can be arranged closer to each other. As a result, the high-voltage power supply unit can achieve high precision and small size.

The first embodiment has described the image forming apparatus by exemplifying a transfer high-voltage power supply used for a color image forming apparatus of a tandem system. In a high-voltage power supply unit which outputs different bias voltages, mutual interference or the influence of electrostatic capacitive coupling of piezoelectric transformers can be precluded by connecting capacitors of different characteristics between ground and the output terminals of adjacent piezoelectric transformers.

When the circuit arrangement in FIG. 1A is applied to the high-voltage power supply apparatus 202, the high-voltage power supply apparatus 202 can output a bias free from mutual interference or the influence (voltage generated by interference) of mutual interference between piezoelectric transformers due to electrostatic capacitive coupling.

The first embodiment can provide a power supply apparatus using piezoelectric transformers which can suppress the interference between the driving frequencies of the piezoelectric transformers and implement downsizing and a high image quality.

The first embodiment can provide an image forming apparatus having the power supply apparatus.

Second Embodiment

The first embodiment has described a method of driving piezoelectric transformers at different frequencies in order to preclude mutual interference between the piezoelectric transformers in a high-voltage power supply apparatus using a voltage doubler rectification circuit. The second embodiment will explain a high-voltage power supply apparatus using a piezoelectric transformer which does not require any voltage doubler rectification circuit when, for example, the output voltage is relatively low.

Figure 4A:
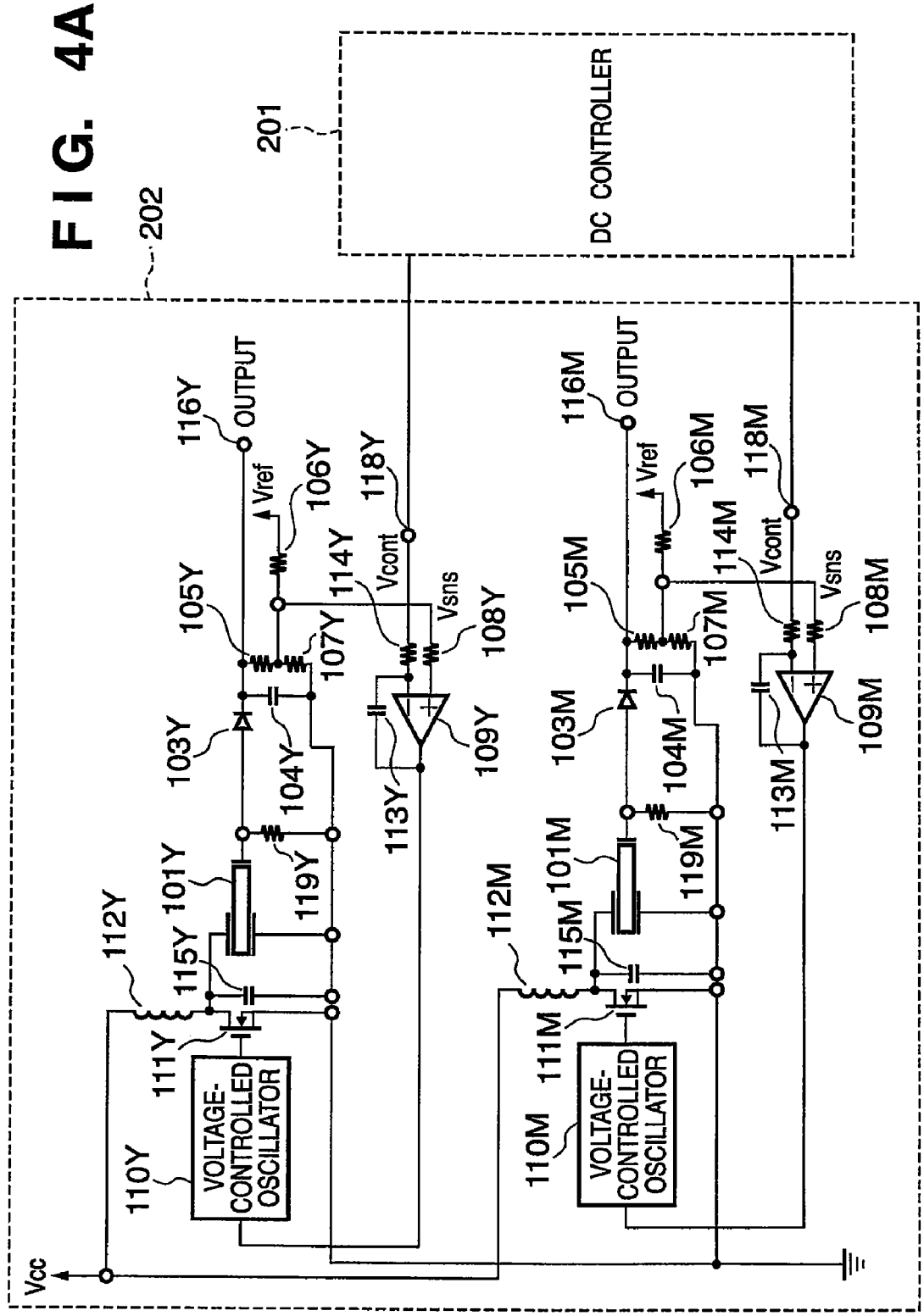
FIG. 4A is a circuit diagram showing the circuit arrangement of a transfer high-voltage power supply using a piezoelectric transformer according to the second embodiment.
Figure 4B:
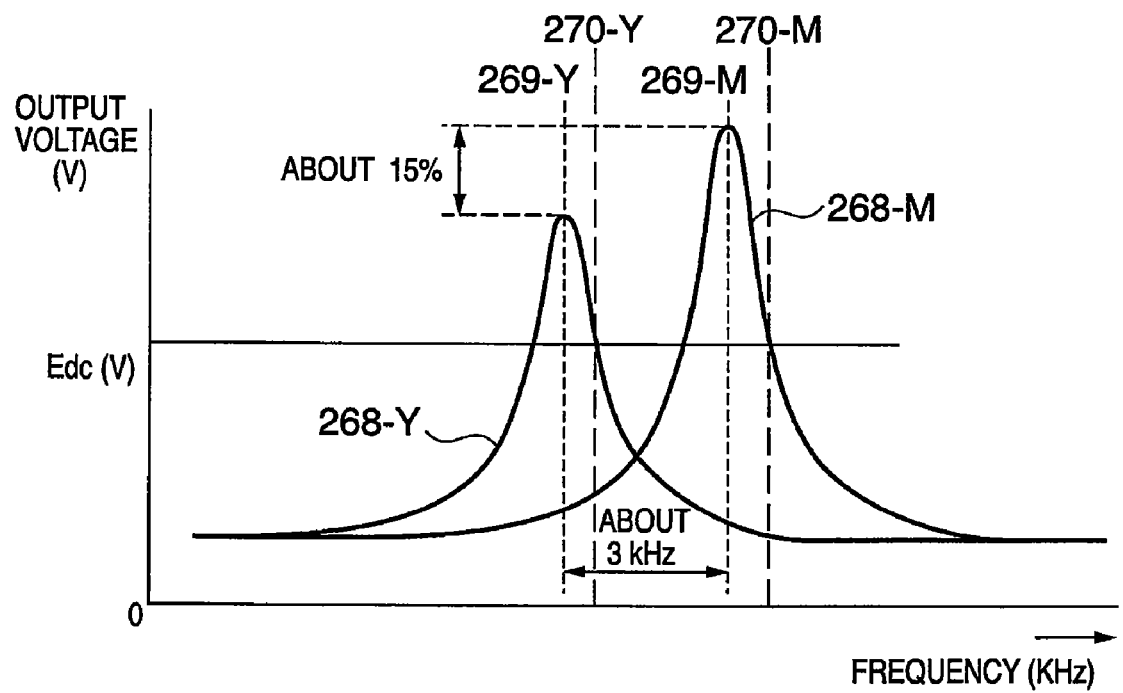
FIG. 4B is a graph showing the relationship between the driving frequencies and output voltages of piezoelectric transformers 101Y and 101M according to the second embodiment.

FIG. 4A is a circuit diagram showing the circuit arrangement of a transfer high-voltage power supply using a piezoelectric transformer according to the second embodiment. FIG. 4B is a graph showing the relationship (frequency characteristic) between the driving frequencies and output voltages of piezoelectric transformers 101Y and 101M of the high-voltage power supply when yellow (Y) and magenta (M) images are formed by the circuit arrangement (FIG. 4A). Note that a description of building components common to those of the first embodiment will be omitted.

The circuit arrangement in FIG. 4A is different from that in FIG. 1A in that the rectification means is a half wave rectification circuit made up of a diode 103 and capacitor 104 and a resistor 119 is connected between ground and the output terminal of the piezoelectric transformer 101. The resonance frequencies and step-up ratios of the piezoelectric transformers 101Y and 101M depend on load impedances connected to their output terminals. As the load impedance decreases, the resonance frequency (maximum output frequency) and step-up ratio also decrease.

The first embodiment has described an arrangement and operation using the difference between driving frequencies depending on the magnitude of the capacitive load. The second embodiment will explain an arrangement and operation using the difference between resistance loads.

The circuit arrangement of FIG. 4A adopts a 10-MΩ resistor 119Y and 40-MΩ resistor 119M. A preferable circuit arrangement can be provided when the yellow (Y) resistor 119Y and magenta (M) resistor 119M have different resistance values. Note that the same effects can be obtained even when no resistance load is connected between ground and the output terminal of the piezoelectric transformer in a circuit arrangement corresponding to either yellow (Y) or magenta (M) image formation.

FIG. 4B is a graph showing the relationship (frequency characteristic) between the driving frequencies and output voltages of the piezoelectric transformers 101Y and 101M according to the second embodiment. In FIG. 4B, 268-M represents a frequency characteristic when the 40-MΩ resistor 119M is connected, and 268-Y represents a frequency characteristic when the 10-MΩ resistor 119Y is connected. Compared to the frequency characteristic 268-M for the 40-MΩ load resistance, the frequency characteristic 268-Y for the 10-MΩ load resistance decreases by about 3 kHz the maximum output frequency for applying a maximum output voltage, and decreases the maximum output by about 15%. Although the maximum output voltage drops by about 15%, the maximum output voltage value is much higher than the control output voltage (Edc) used in the second embodiment, and is satisfactory for control operation of the circuit.

The driving frequencies of piezoelectric transformers corresponding to the control output voltage (Edc) (V) are represented by 270-Y and 270-M. The difference between the driving frequencies is given from the relation of equation (1);

$$fbeet=|(270\text{-}M)-(270\text{-}Y)|(\text{kHz}) \quad (4)$$

The result given by equation (4) takes almost the same value as the maximum output frequency difference of 3 kHz. For the process speed PS=100 (mm/S), the interference image cycle Tb is given from the relation of equation (2):

$$Tb=PS/fbeet=100/3000=0.033 \text{ (mm)} \quad (5)$$

Since an interference image cycle of 0.3 mm or more can be visually recognized, the interference image cycle Tb of 0.033 mm is a cycle (pitch) which cannot be visually recognized.

Even when the half wave rectification circuit is employed, resistance elements different in resistance value are respectively connected between ground and the output terminals of adjacent piezoelectric transformers. This structure can shift the distribution of the frequency characteristic so as to prevent the resonance frequencies of the piezoelectric transformers from coming close to each other. The shift of the distribution of the frequency characteristic can preclude the influence (generation of a voltage by interference) of mutual interference between piezoelectric transformers depending on the power supply pattern or mutual interference between piezoelectric transformers due to electrostatic capacitive coupling.

The bias voltage can be stabilized by avoiding the influence of mutual interference, and piezoelectric transformers can be arranged closer to each other. Consequently, the high-voltage power supply unit can implement high precision and small size.

The second embodiment can provide a power supply apparatus using piezoelectric transformers which can suppress the interference between the driving frequencies of the piezoelectric transformers and implement downsizing and a high image quality.

The second embodiment can provide an image forming apparatus having the power supply apparatus.

Third Embodiment

Figure 5A:
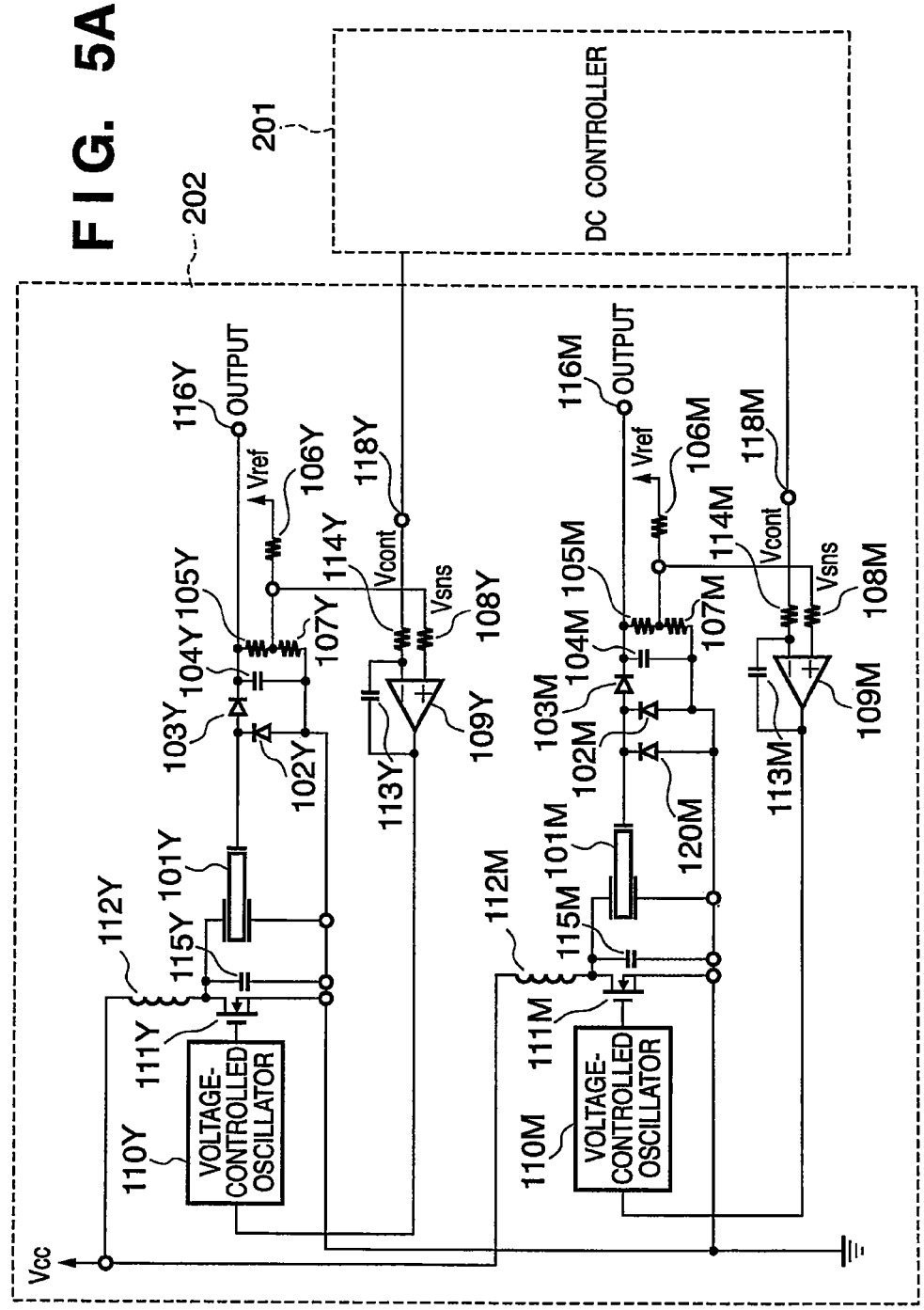
FIG. 5A is a circuit diagram showing the circuit arrangement of a transfer high-voltage power supply using a piezoelectric transformer according to the third embodiment.

FIG. 5A is a circuit diagram showing the circuit arrangement of a transfer high-voltage power supply using a piezoelectric transformer according to the third embodiment of the present invention. Note that a description of the same building components as those of the circuit arrangements described in the first and second embodiments will be omitted. The third embodiment is mainly different from the first and second embodiments in that the number of diodes (rectification elements) used which are connected between ground and the output terminal of a piezoelectric transformer 101 is changed in a high-voltage power supply apparatus using a voltage doubler rectification circuit.

In the circuit arrangement shown in FIG. 5A, high-voltage diodes 102Y, 102M, and 120M used in the rectification circuit generally have an electrostatic capacitance of 3 to 4 pF. The third embodiment positively utilizes the electrostatic capacitances of the diodes, and performs the same operation as that when capacitive elements such as capacitors are added to the output terminals of piezoelectric transformers 101Y and 101M.

Figure 5B:
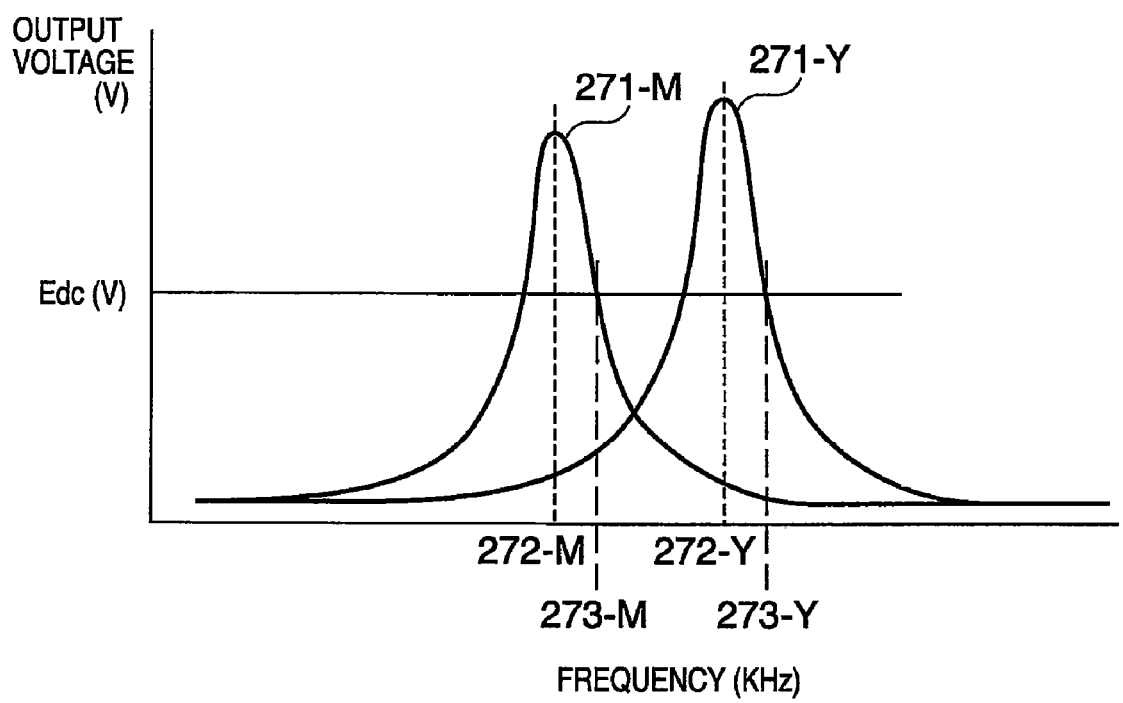
FIG. 5B is a graph showing the relationship between the driving frequencies and output voltages of piezoelectric transformers 101Y and 101M according to the third embodiment.

FIG. 5B is a graph showing the relationship (frequency characteristic) between the driving frequencies and output voltages of the piezoelectric transformers 101Y and 101M of the high-voltage power supply when yellow (Y) and magenta (M) images are formed by the circuit arrangement shown in FIG. 5A. In FIG. 5B, 271-Y represents the frequency characteristic of the piezoelectric transformer 101Y connected to a general voltage doubler rectification circuit. A frequency (maximum output frequency) for applying a maximum output voltage is 272-Y, and a driving frequency corresponding to the control output voltage (Edc) (V) is 273-Y. Also, 271-M represents the frequency characteristic of the piezoelectric transformer 101M when the high-voltage diode 120M is added between ground and the output terminal of the piezoelectric transformer 101M. A frequency (maximum output frequency) for applying a maximum output voltage is 272-M, and a driving frequency corresponding to the control output voltage (Edc) (V) is 273-M.

In the third embodiment, the driving frequencies of the piezoelectric transformers 101M and 101Y at the control output voltage (Edc) (V) are 273-M=158 kHz and 273-Y=161 kHz. The driving frequency of the piezoelectric transformer to which the diode 120M is added substantially coincides with a driving frequency obtained when a 3-pF capacitor is added in the first embodiment (see the column of the capacitance "3 pF" for the capacitor 117a in FIG. 3C). This is because the equivalent electrostatic capacitance of the diode 120M is about 3 pF. At this time, the difference between the driving frequencies corresponding to the control output voltage (Edc) (V) is given from the relation of equation (1):

$$fbeet = |(273 - Y) - (273 - M)| (\text{kHz}) \quad (6)$$
$$= |161 - 158| = 3 \text{ kHz}$$

For the process speed PS=100 (mm/S), the interference image cycle Tb is given from the relation of equation (2):

$$Tb = PS/fbeet = 100/3000 = 0.033 \text{ (mm)} \quad (7)$$

Since an interference image cycle of 0.3 mm or more can be visually recognized, the interference image cycle Tb of 0.033 mm is a cycle (pitch) which cannot be visually recognized.

In the circuit arrangement of the third embodiment, the numbers of diodes connected between ground and the output terminals of adjacent piezoelectric transformers are changed. The distribution of the frequency characteristic can, therefore, be shifted to prevent the resonance frequencies of the piezoelectric transformers from coming close to each other. The shift of the distribution of the frequency characteristic can preclude the influence (generation of a voltage by interference) of mutual interference between piezoelectric transformers depending on the power supply pattern or mutual interference between piezoelectric transformers due to electrostatic capacitive coupling.

The bias voltage can be stabilized by avoiding the influence of mutual interference, and piezoelectric transformers can be arranged closer to each other. The high-voltage power supply unit can achieve high precision and small size.

The third embodiment can provide a power supply apparatus using piezoelectric transformers which can suppress the interference between the driving frequencies of the piezoelectric transformers and implement downsizing and a high image quality.

The third embodiment can provide an image forming apparatus having the power supply apparatus.

Fourth Embodiment

A high-voltage power supply apparatus 202 according to the fourth embodiment comprises a piezoelectric transformer which outputs a voltage, and a rectification element which rectifies and smoothes a voltage output from the piezoelectric transformer in accordance with the load and outputs the resultant voltage. The high-voltage power supply apparatus 202 comprises a voltage-controlled oscillator which controls the frequency of an output signal in accordance with an input control signal, and a power supply voltage supply element which is driven by a signal output from the voltage-controlled oscillator and supplies a power supply voltage to the piezoelectric transformer.

The high-voltage power supply apparatus 202 further comprises a resonance frequency change means (resonance frequency change circuit) 917Y which is connected between ground and the output terminal of a piezoelectric transformer (e.g., 101Y). The resonance frequency change means (resonance frequency change circuit) 917Y can drive the piezoelectric transformer 101Y at a driving frequency different from that of another piezoelectric transformer (e.g., 101M).

Figure 9:
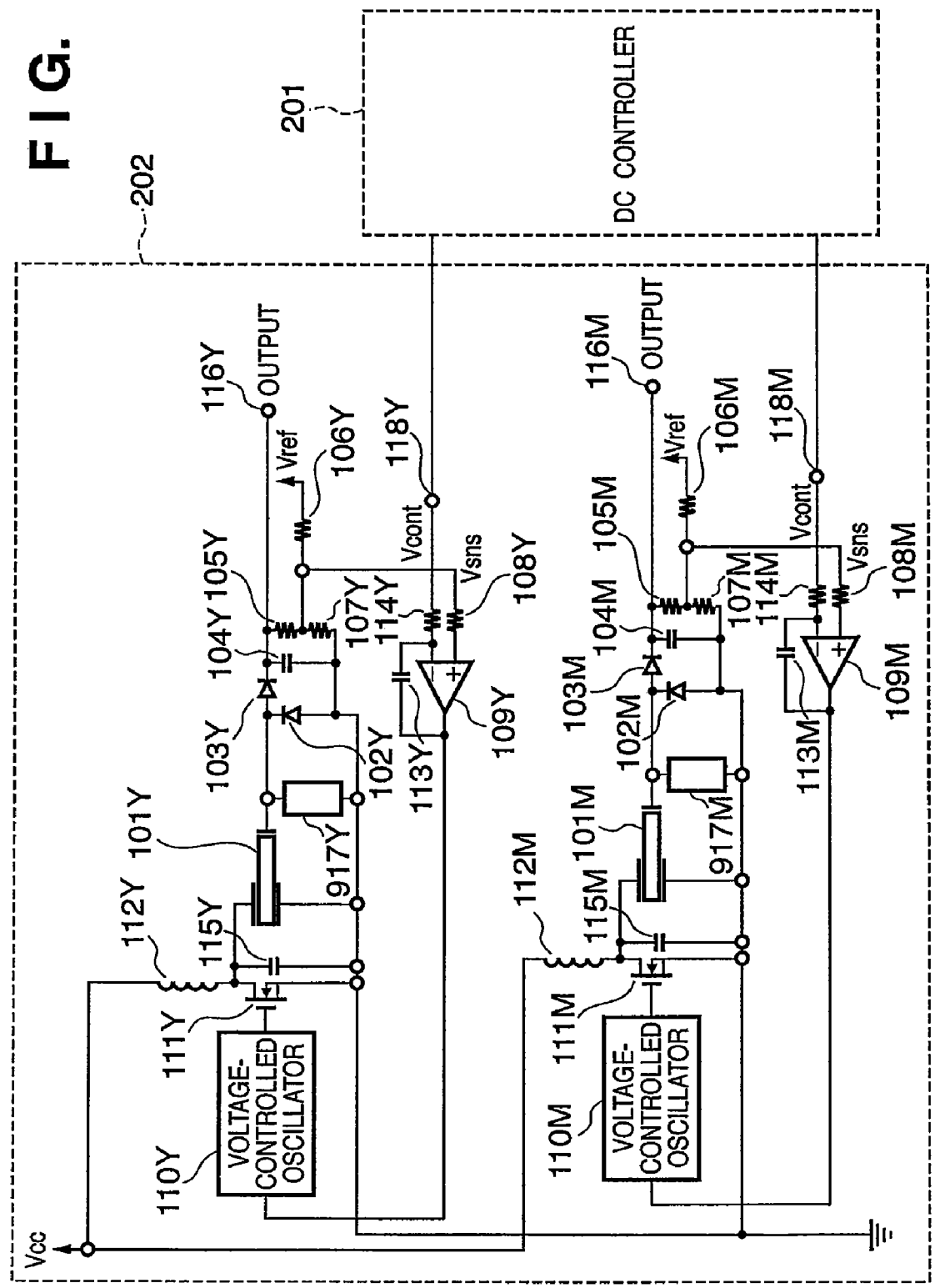
FIG. 9 is a circuit diagram showing the circuit arrangement of a transfer high-voltage power supply using a piezoelectric transformer according to the fourth embodiment.

FIG. 9 is a circuit diagram showing the circuit arrangement of a transfer high-voltage power supply using a piezoelectric transformer according to the fourth embodiment.

This circuit arrangement is different from that in FIG. 1A according to the first embodiment in that the resonance frequency change means (resonance frequency change circuit) 917Y and a resonance frequency change means (resonance frequency change circuit) 917M are respectively connected between ground and the output terminals of the piezoelectric transformers 101Y and 101M.

The resonance frequency change circuits 917Y and 917M can variably control the driving frequencies of the piezoelectric transformers 101Y and 101M. One resonance frequency change circuit 917Y can variably set a load characteristic different from that of the other resonance frequency change means (resonance frequency change circuit) 917M which is connected between ground and the output terminal of the piezoelectric transformer 101M. The load characteristic which can be variably set includes, e.g., a capacitive load, a resistance loads, a load equivalent to connection of a diode, and a combination of them.

The resonance frequency change circuits 917Y and 917M can obtain the same effects as those by connection of a capacitive load described in the first embodiment, connection of a resistance load described in the second embodiment, and connection of a diode described in the third embodiment. The variable amounts (Fvari) of the driving frequencies of the resonance frequency change circuits 917Y and 917M can be controlled including variations (Fdiff) of the resonance frequencies of the piezoelectric transformers including voltage-controlled oscillators. The relationship between the variable amount (Fvari) of the driving frequency and the variation (Fdiff) of the resonance frequency can be set to satisfy $$F\text{vari (Hz)} > F\text{diff (Hz)} \quad (8)$$

For example, the varying range of the resonance frequency of the piezoelectric transformer is 2.2 (kHz), and the frequency of the varying range of the resonance frequency including variations of the voltage-controlled oscillator is set to Fdiff(Hz)=about 2.4 (kHz). In this case, when the variable amount (Fvari) of the driving frequency in the resonance frequency change circuit 917(Y,M) is set to 3 kHz or more, the distribution of the frequency characteristic can be shifted to prevent resonance frequencies from coming close to each other even under the influence of variations. The shift of the distribution of the frequency characteristic can preclude the influence (generation of a voltage by interference) of mutual interference between piezoelectric transformers depending on the power supply pattern or mutual interference between piezoelectric transformers due to electrostatic capacitive coupling. The bias voltage can be stabilized by precluding the influence of mutual interference, and piezoelectric transformers can be arranged closer to each other. The high-voltage power supply unit can, therefore, achieve high precision and small size.

The first to third embodiments implement preferable circuit arrangements (FIGS. 1A, 4A, and 5A) by connecting a capacitive element, resistance element, and diode (rectification element) which satisfy the relation of inequality (8) and have a load characteristic.

The above embodiments have explained a transfer high-voltage power supply used for a color image forming apparatus of a tandem system. The gist of the present invention can also be applied to preclude mutual interference or the influence (voltage generated by interference) of mutual interference between piezoelectric transformers due to electrostatic capacitive coupling in a high-voltage power supply unit which outputs different bias voltages.

As an application target of the present invention, the image forming apparatus is not limited to a color image forming apparatus, and may be a monochrome image forming apparatus which forms a monochrome image. By applying the circuit arrangement in any one of FIGS. 1A, 4A, and 5A to the high-voltage power supply apparatus 202 which configures the image forming apparatus 401, the high-voltage power supply apparatus 202 can output a bias free from mutual interference or the influence of mutual interference between piezoelectric transformers due to electrostatic capacitive coupling.

The fourth embodiment can provide a power supply apparatus using piezoelectric transformers which can suppress the interference between the driving frequencies of the piezoelectric transformers and implement downsizing and a high image quality.

The fourth embodiment can provide an image forming apparatus having the power supply apparatus.

Fifth Embodiment

Figure 10:
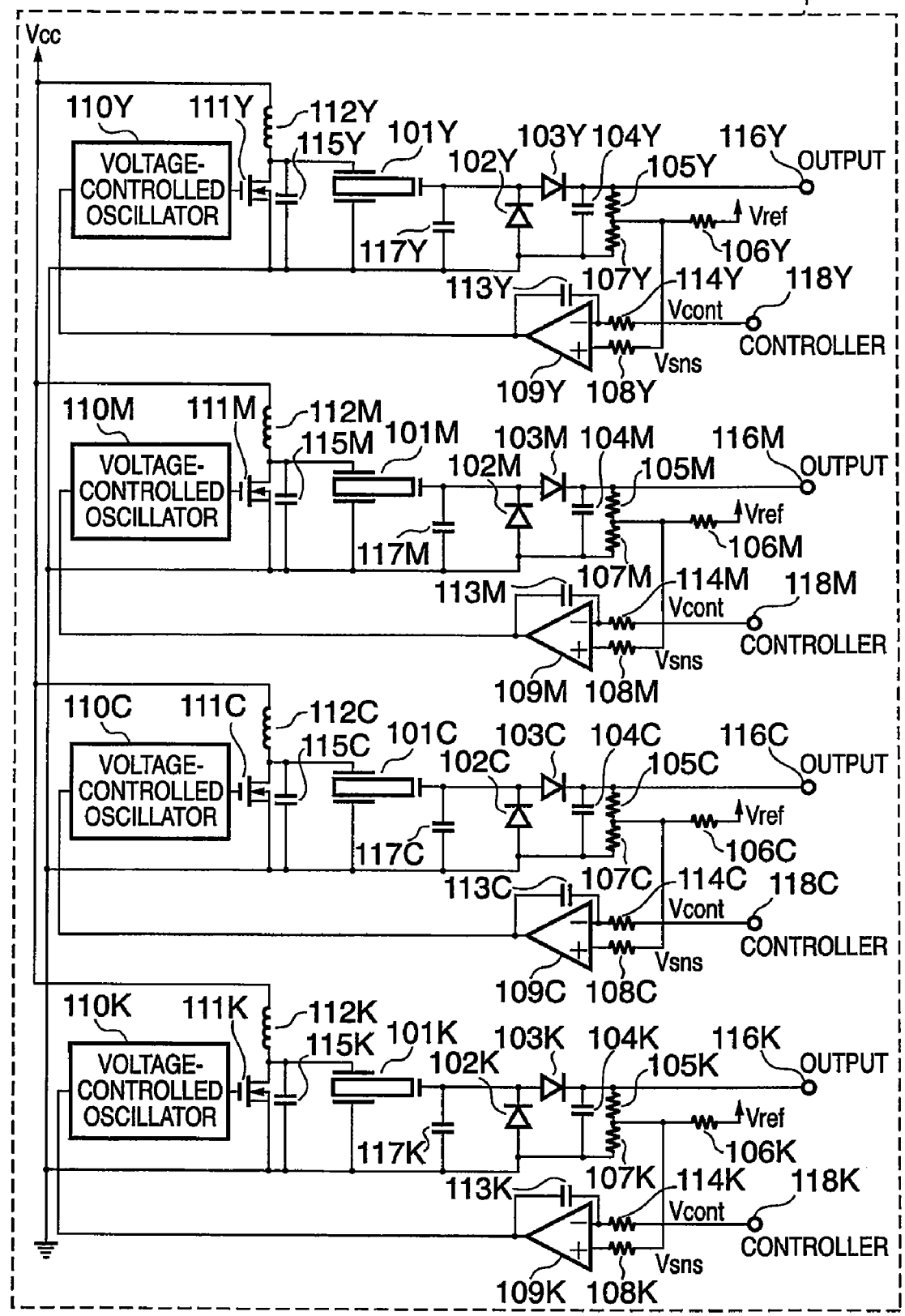
FIG. 10 is a circuit diagram showing the circuit arrangement of a transfer high-voltage power supply using a piezoelectric transformer according to the fifth embodiment.

The fifth embodiment of the present invention will be described below with reference to FIG. 10. FIG. 10 is a circuit diagram showing the circuit arrangement of a transfer high-voltage power supply using a piezoelectric transformer. The fifth embodiment is effective for both positive- and negative-voltage output circuits. The fifth embodiment will explain a transfer high-voltage power supply which typically requires a positive voltage. The transfer high-voltage power supply includes four circuits in correspondence with transfer rollers 430Y, 430M, 430C, and 430K for yellow (Y), magenta (M), cyan (C), and black (K). The same reference numerals as those described in the first embodiment with reference to FIG. 1A denote the same building components. The operation principle of the circuit has been described in the above embodiments, and a detailed description thereof will be omitted.

Figure 16:
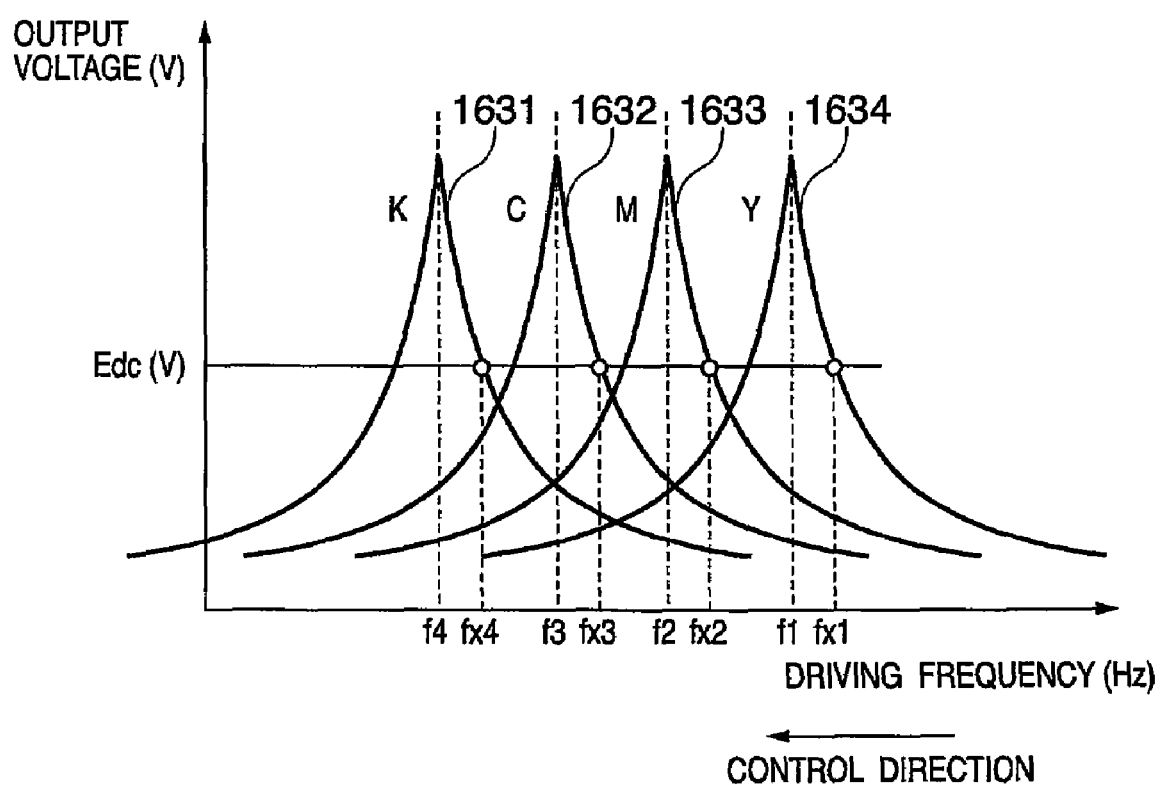
FIG. 16 is a graph showing the relationship between the driving frequency and the output voltage.

Before an explanation of the fifth embodiment, problems in changing the driving frequency of the piezoelectric transformer and increasing the image quality will be explained with reference to FIGS. 16 and 17. FIG. 16 is a graph showing the distributions (1634, 1633, 1632, and 1631) of the driving frequencies of piezoelectric transformers corresponding to Y, M, C, and K. In FIG. 16, printing is done in the order of Y, M, C, and K. The driving frequency is controlled from a high frequency to a low one (in the control direction in FIG. 16). A control output voltage (Edc) is output at driving frequencies fx1, fx2, fx3, and fx4. In the distributions of the driving frequencies of the piezoelectric transformers corresponding to Y, M, C, and K, the output voltages of the piezoelectric transformers for the respective colors maximize at frequencies f1, f2, f3, and f4.

Figure 17:
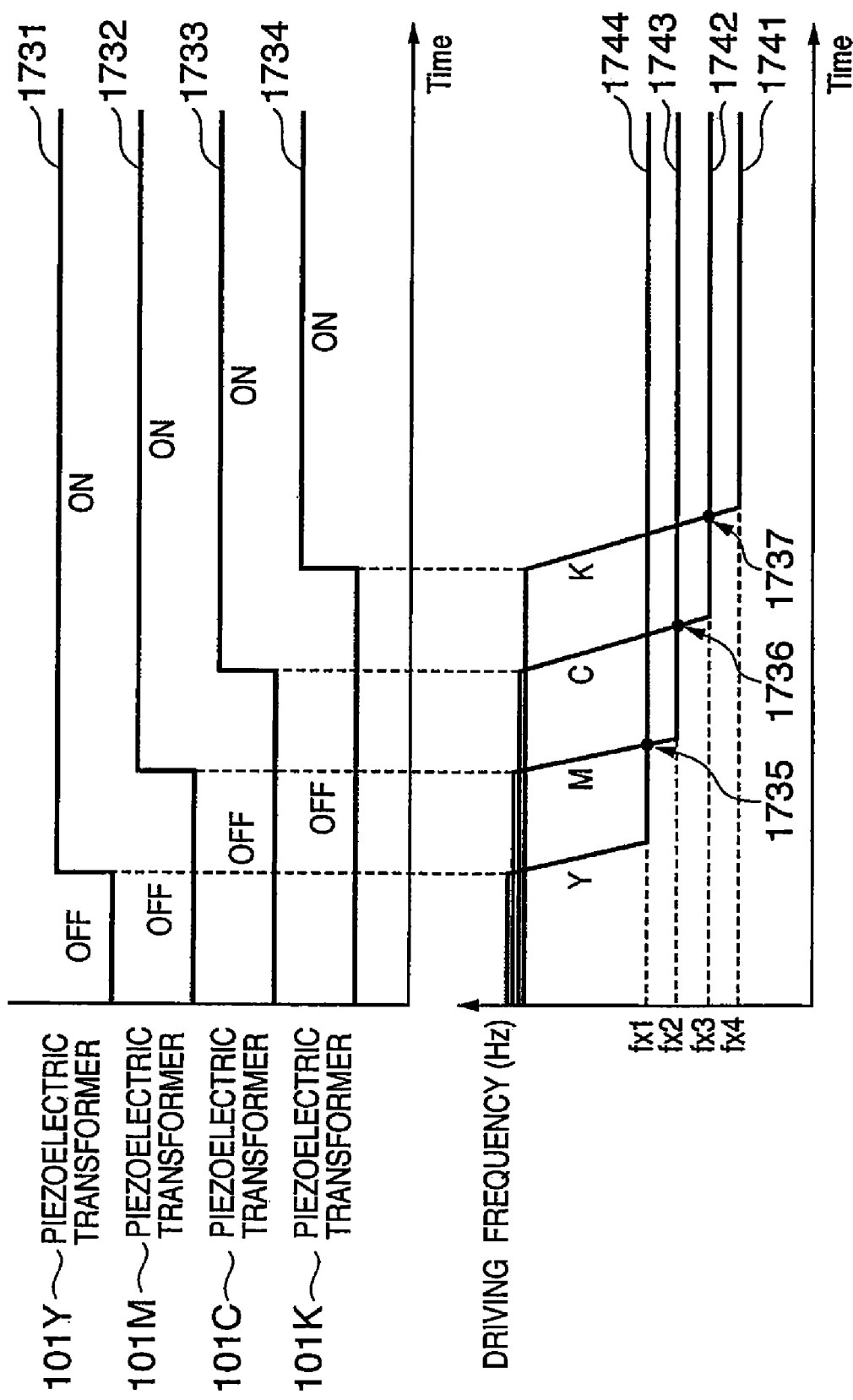
FIG. 17 is a timing chart showing the relationship between the driving frequency and the timing when a control output voltage is output.

FIG. 17 is a timing chart showing the relationship between the driving frequencies (fx1, fx2, fx3, and fx4) and timings when the control output voltage (Edc) is output. The target control output voltage (Edc) is output at the leading edge timings of biases corresponding to the driving frequencies (fx1 to fx4) of the piezoelectric transformers corresponding to Y, M, C, and K. The piezoelectric transformers change from OFF to ON (1731 to 1734).

If a piezoelectric transformer 101M begins to be driven at the driving frequency fx2 (1743) while the piezoelectric transformer 101Y is driven at the driving frequency fx1 (1744), the driving frequency fx2 interferes with the driving frequency fx1 at a point 1735. If a piezoelectric transformer 101C begins to be driven at the driving frequency fx3 (1742) while the piezoelectric transformer 101M is driven at the driving frequency fx2 (1743), the driving frequency fx3 interferes with the driving frequency fx2 at a point 1736. If a piezoelectric transformer 101K begins to be driven at the driving frequency fx4 (1741) while the piezoelectric transformer 101C is driven at the driving frequency fx3 (1742), the driving frequency fx4 interferes with the driving frequency fx3 at a point 1737. If a driving frequency for one color interferes with that for another color, the bias voltage temporarily varies and appears as a striped pattern in an output image, degrading the image quality. In particular, the interference between driving frequencies at the rise of the bias may be a serious problem on the first page in continuous printing or each page in intermittent printing.

A feature of the circuit arrangement of the fifth embodiment is that capacitors 117Y, 117M, 117C, and 117K different in electrostatic capacitance are respectively connected to the output terminals of piezoelectric transformers 101Y, 101M, 101C, and 101K. FIG. 11 is a graph showing the relationship between the driving frequency and output voltage of the circuit when the electrostatic capacitance is changed. In FIG. 11, reference numeral 1101 denotes a distribution representing the relationship between the driving frequency and the output voltage when the electrostatic capacitance of the capacitor 117(Y,M,C,K) is set to 10 pF. Reference numeral 1102 denotes a distribution representing the relationship between the driving frequency and the output voltage when the electrostatic capacitance is set to 7 pF. Reference numeral 1103 denotes a distribution representing the relationship between the driving frequency and the output voltage when the electrostatic capacitance is set to 5 pF. Reference numeral 1104 denotes a distribution representing the relationship between the driving frequency and the output voltage when the electrostatic capacitance is set to 3 pF. As the electrostatic capacitance set for the capacitor 117(Y,M,C,K) increases, the peak (maximum driving frequency) of the driving frequency shifts to the low-frequency side.

FIGS. 12A and 12B are timing charts showing the timing of high-voltage charging operation when the image forming apparatus forms an image. FIG. 12A shows the timing when the piezoelectric transformer 101(Y,M,C,K) switches from OFF to ON in continuous printing. At this timing, the OFF piezoelectric transformers 101Y, 101M, 101C, and 101K are turned on in the order of Y, M, C, and K. In the ON state, the piezoelectric transformer is kept on while a print sheet exists (presence of a sheet) and while a print sheet is conveyed (between sheets). FIG. 12B shows the timing when the piezoelectric transformer 101(Y,M,C,K) switches from OFF to ON in intermittent printing. Similar to continuous printing, the OFF piezoelectric transformers 101Y, 101M, 101C, and 101K are turned on in the order of Y, M, C, and K. Also in development and transfer, the piezoelectric transformers 101Y, 101M, 101C, and 101K operate in the same order.

Considering the driving order of Y, M, C, and K, the electrostatic capacitances of the capacitors 117Y, 117M, 117C, and 117K in the circuit arrangement of FIG. 10 are changed to shift the peaks (maximum driving frequencies) of the driving frequencies of the circuits.

Figure 13:
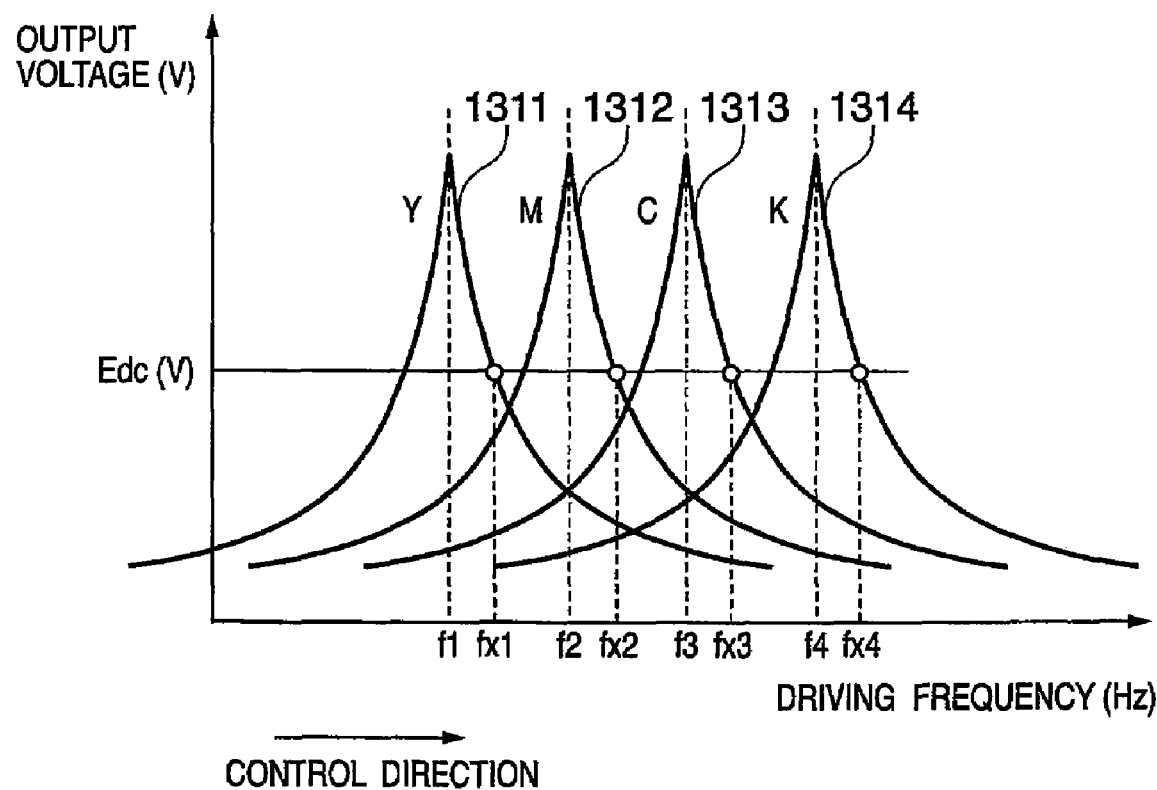
FIG. 13 is a graph showing the relationship between the driving frequency and the output voltage according to the fifth embodiment.

As an example of electrostatic capacitance settings, the capacitor 117Y is set to 10 pF; the capacitor 117M, to 7 pF; the capacitor 117C, to 5 pF; and the capacitor 117K, to 3 pF. FIG. 13 shows the relationship between the driving frequency and the output voltage when these electrostatic capacitances are set for the capacitors 117Y, 117M, 117C, and 117K.

In FIG. 13, reference numeral 1311 denotes a distribution representing the relationship between the driving frequency and the output voltage when the electrostatic capacitance of the capacitor 117Y is set to 10 pF. Reference numeral 1312 denotes a distribution representing the relationship between the driving frequency and the output voltage when the electrostatic capacitance of the capacitor 117M is set to 7 pF. Reference numeral 1313 denotes a distribution representing the relationship between the driving frequency and the output voltage when the electrostatic capacitance of the capacitor 117C is set to 5 pF. Reference numeral 1314 denotes a distribution representing the relationship between the driving frequency and the output voltage when the electrostatic capacitance of the capacitor 117K is set to 3 pF. At driving frequencies f1, f2, f3, and f4, the output voltages of the piezoelectric transformers 101Y, 101M, 101C, and 101K for the respective colors maximize. Y, M, C, and K driving frequencies corresponding to a target control output voltage (Edc) are fx1, fx2, fx3, and fx4, and these driving frequencies satisfy $$fx1 < fx2 < fx3 < fx4 \tag{9}$$

Figure 14:
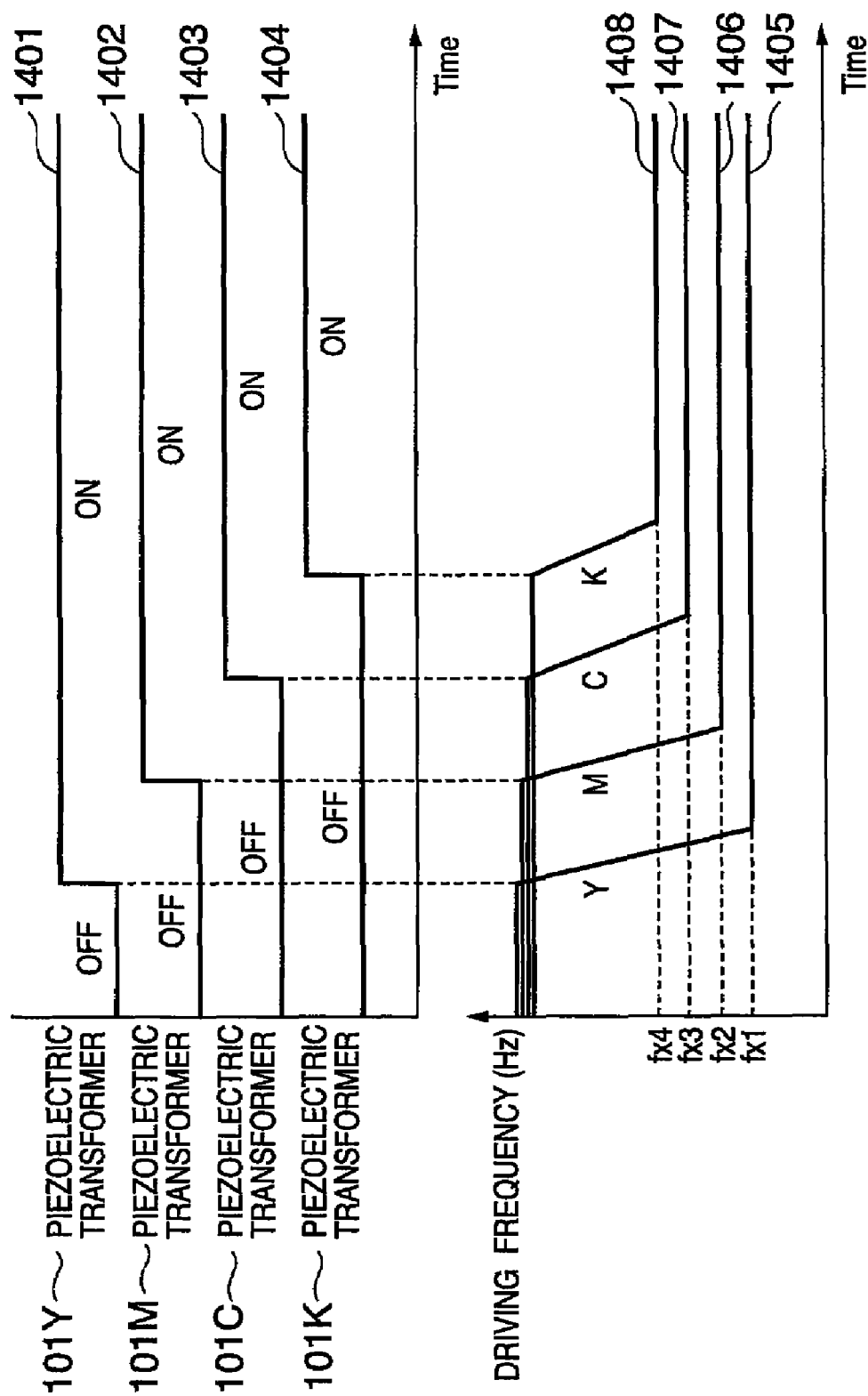
FIG. 14 is a timing chart showing the relationship between the driving frequency and the timing when a control output voltage is output according to the fifth embodiment.

FIG. 14 is a timing chart showing the relationship between the driving frequencies (fx1, fx2, fx3, and fx4) and timings when the control output voltage (Edc) is output. The target control output voltage (Edc) is output at the leading edge timings of biases at the driving frequencies (fx1 to fx4) of the piezoelectric transformers corresponding to Y, M, C, and K. Then, the piezoelectric transformers changes from OFF to ON (1401 to 1404).

Even if the piezoelectric transformer 101M begins to be driven at the driving frequency fx2 (1406) while the piezoelectric transformer 101Y is driven at the driving frequency fx1 (1405), no point where the driving frequencies cross each other is generated, and the driving frequencies do not interfere with each other.

Also, the driving frequency of the piezoelectric transformer 101(M,C,K) does not interfere with the driving frequencies of the remaining piezoelectric transformers.

Hence, the interference between driving frequencies can be precluded by changing and setting the electrostatic capacitances of the capacitors 117Y, 117M, 117C, and 117K so that the circuit arrangement shown in FIG. 10 satisfies the relation between the driving frequencies in inequality (9).

This setting can prevent degradation of the image quality in continuous printing (particularly on the first page) or on each page of intermittent printing.

The fifth embodiment can provide a power supply apparatus using piezoelectric transformers which can suppress the interference between the driving frequencies of the piezoelectric transformers and implement downsizing and a high image quality.

The fifth embodiment can provide an image forming apparatus having the power supply apparatus.

Sixth Embodiment

The sixth embodiment of the present invention will be described below. The sixth embodiment also adopts the circuit arrangement in FIG. 10. The sixth embodiment is mainly different from the fifth embodiment in that voltages to drive piezoelectric transformers 101Y, 101M, 101C, and 101K are changed between the colors by changing the constants of resonance circuits, and a driving frequency for a target control output voltage (Edc) is changed by changing resonance characteristics. An image forming apparatus according to the sixth embodiment also forms images in the order of Y, M, C, and K. High charging voltages rise in the same order, and high development voltages and high transfer voltages also rise in the same order.

Letting $C_{115Y}$, $C_{115M}$, $C_{115C}$, and $C_{115K}$ be the electrostatic capacitances of capacitors 115Y, 115M, 115C, and 115K shown in FIG. 10, these electrostatic capacitances satisfy inequality (10). Since capacitors 117Y, 117M, 117C, and 117K have the same setting value, the maximum driving frequencies of Y, M, C, and K are equal in the relationship between the driving frequency and the output voltage. In other words, these maximum driving frequencies coincide with each other, unlike the maximum driving frequencies (f1, f2, f3, and f4) in FIG. 13.

$$C_{115Y} > C_{115M} > C_{115C} > C_{115K} \tag{10}$$

Figure 15:
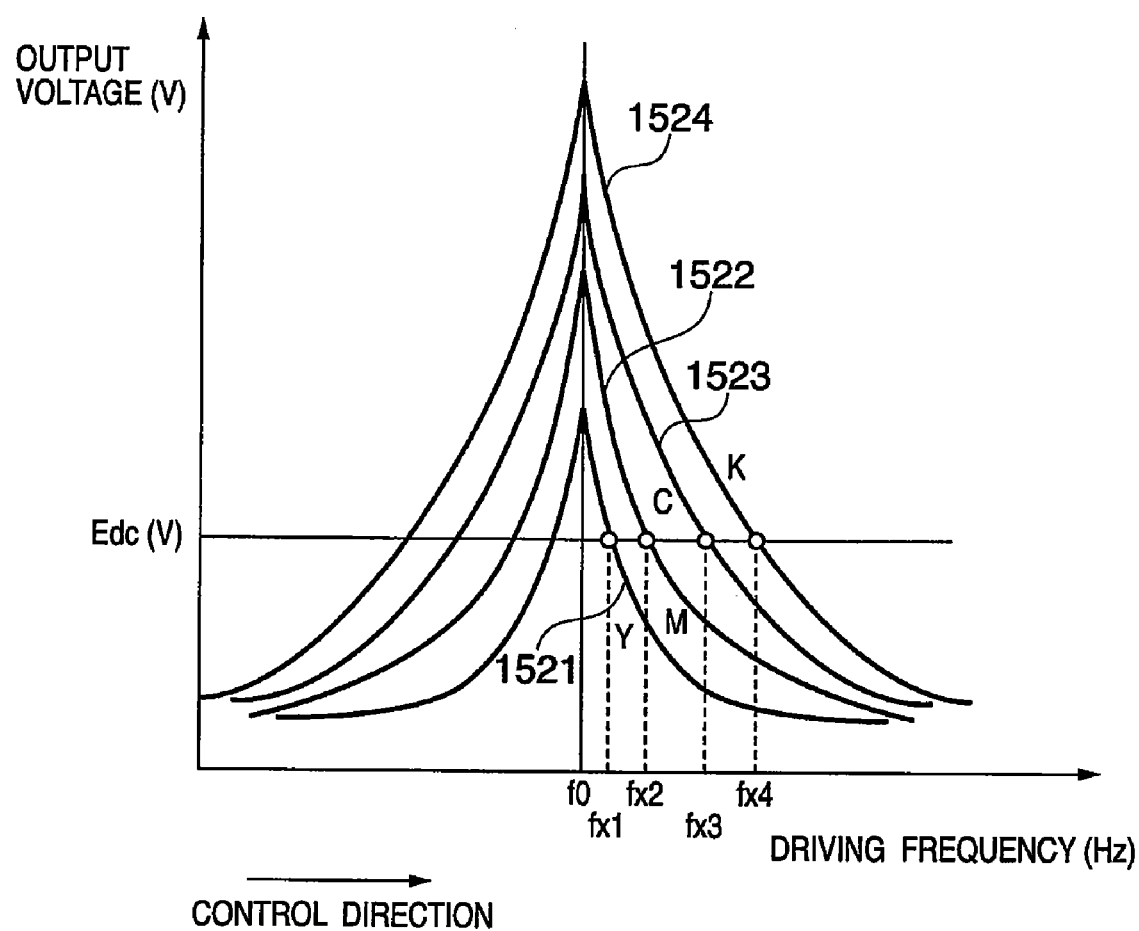
FIG. 15 is a graph showing the relationship between the driving frequency and the output voltage according to the sixth embodiment.

When the electrostatic capacitance values of the capacitors 115Y, 115M, 115C, and 115K are set to satisfy inequality (10), the resonance characteristics and step-up ratios of the circuits for the respective colors change, and voltages to drive the piezoelectric transformers also change. FIG. 15 is a graph showing the relationship between the piezoelectric transformer 101(Y,M,C,K) and the output voltage when the electrostatic capacitance value of the capacitor 115(Y,M,C,K) is set to satisfy inequality (10). In FIG. 15, reference numeral 1521 denotes a distribution representing the relationship between the driving frequency and the output voltage on the basis of the electrostatic capacitance setting of the capacitor 115Y. Reference numeral 1522 denotes a distribution representing the relationship between the driving frequency and the output voltage on the basis of the electrostatic capacitance setting of the capacitor 115M. Reference numeral 1523 denotes a distribution representing the relationship between the driving frequency and the output voltage on the basis of the electrostatic capacitance setting of the capacitor 115C. Reference numeral 1524 denotes a distribution representing the relationship between the driving frequency and the output voltage on the basis of the electrostatic capacitance setting of the capacitor 115K.

In FIG. 15, the Y step-up ratio represented by reference numeral 1521 is the lowest, and the K step-up ratio represented by reference numeral 1524 is the highest. For each color, the maximum output voltage is output at the resonance frequency $f_0$ (resonance frequency). The distribution of the output voltage (V) forms a bell shape using $f_0$ as the center. The driving frequencies can be set to different frequencies by changing the driving frequencies for the respective colors corresponding to the target control output voltage (Edc) to fx1, fx2, fx3, and fx4 in the order of Y, M, C, and K.

Similarly, the resonance characteristics and step-up ratios can be changed by changing the values of inductors 112Y, 112M, 112C, and 112K for the respective colors. The driving frequencies fx1, fx2, fx3, and fx4 for the respective colors corresponding to the target control output voltage (Edc) can be set to different frequencies.

The electrostatic capacitance values of the capacitors 115Y, 115M, 115C, and 115K are set so that the relation between the driving frequencies of the piezoelectric transformers 101Y, 101M, 101C, and 101K satisfies the relation of inequality (9) in accordance with the order of colors (e.g., Y→M→C→K→K) in which image formation starts.

Also in this case, as shown in FIG. 14, even if the piezoelectric transformer 101M begins to be driven at the driving frequency fx2 (1406) while the piezoelectric transformer 101Y is driven at the driving frequency fx1 (1405), no point where the driving frequencies cross each other is generated, i.e., the driving frequencies do not interfere with each other. In addition, the driving frequency of the piezoelectric transformer 101(M,C,K) does not interfere with the driving frequencies of the remaining piezoelectric transformers.

The interference between driving frequencies can, therefore, be precluded by changing and setting the electrostatic capacitances of the capacitors 117Y, 117M, 117C, and 117K in accordance with inequality (10) so that the circuit arrangement shown in FIG. 10 satisfies the relation between the driving frequencies in inequality (9).

This setting can prevent degradation of the image quality in continuous printing (particularly on the first page) or on each page of intermittent printing.

The sixth embodiment can provide a power supply apparatus using piezoelectric transformers which can suppress the interference between the driving frequencies of the piezoelectric transformers and implement downsizing and a high image quality.

The sixth embodiment can provide an image forming apparatus having the power supply apparatus.

Seventh Embodiment

The seventh embodiment of the present invention will be described below. The seventh embodiment also adopts the circuit arrangement in FIG. 10. In the fifth and sixth embodiments, the driving frequency is set by changing the circuit constant. In the seventh embodiment, piezoelectric transformers whose resonance frequencies are selected in advance are used as piezoelectric transformers 101Y, 101M, 101C, and 101K for the respective colors.

The resonance frequencies (f1, f2, f3, and f4) of the piezoelectric transformers 101Y, 101M, 101C, and 101K are selected to satisfy the relation of inequality (9) in accordance with the order of colors (e.g., Y→M→C→K) in which image formation starts. By selecting the resonance frequencies which satisfy the relation of inequality (9), the relationship between the driving frequency and the output voltage upon driving the piezoelectric transformers 101Y, 101M, 101C, and 101K becomes identical to those shown in FIGS. 13 and 14 in the fifth embodiment.

Since the driving frequencies fx1, fx2, fx3, and fx4 of the piezoelectric transformers 101Y, 101M, 101C, and 101K for the respective colors do not cross each other at the start of image formation, the driving frequencies of the piezoelectric transformers 101Y, 101M, 101C, and 101K do not interfere with each other during image formation.

The above embodiments have described the image forming apparatus by exemplifying a charging high-voltage power supply used in a color image forming apparatus of a tandem system that forms images in the order of Y, M, C, and K. However, the gist of the present invention is not limited to this. For example, the gist of the present invention can also be applied to an image forming apparatus of a tandem system that forms images in another color order at another high-voltage bias for development, transfer, or the like.

According to the seventh embodiment, piezoelectric transformers of resonance frequencies set different in advance are employed in high-voltage circuits for the respective colors. High-voltage circuits which fully exploit the performance of the piezoelectric transformers can be formed without considering the difference in output performance between colors that is generated upon a change in circuit constant.

As a result, the interference between the driving frequencies of the piezoelectric transformers can be precluded by selecting the resonance frequencies of the piezoelectric transformers 101Y, 101M, 101C, and 101K so that the circuit arrangement shown in FIG. 10 satisfies the relation between the driving frequencies in inequality (9).

This setting can prevent degradation of the image quality in continuous printing (particularly on the first page) or on each page of intermittent printing.

The seventh embodiment can construct high-voltage power supply circuits in which piezoelectric transformers of resonance frequencies set different in advance are employed in high-voltage power supply for the respective colors, and the performance of the piezoelectric transformers can be fully exploited without considering the difference in output performance between colors that is generated upon a change in circuit constant.

As many apparently widely different embodiments of the present invention can be made without departing from the spirit and scope thereof, it is to be understood that the invention is not limited to the specific embodiments thereof except as defined in the claims.

What is claimed is:

1. A power supply apparatus comprising a plurality of power supply circuits, each of said power supply circuits having a piezoelectric transformer, and a voltage-controlled oscillator which generates a signal having a driving frequency of the piezoelectric transformer in accordance with a control signal, wherein when voltages to be supplied from at least one power supply circuit and another power supply circuit are output, the voltage-controlled oscillator of said one power supply circuit generates a signal of a frequency which is not close to a frequency of a signal output from the voltage-controlled oscillator of said another power supply circuit.

2. The apparatus according to claim 1, wherein an output side of the piezoelectric transformer in said one power supply circuit is connected to an element of a load characteristic different from an element connected to an output side of the piezoelectric transformer in said another power supply circuit.

3. The apparatus according to claim 2, wherein a difference in driving frequency caused by a difference in load characteristic between the element of said one power supply circuit and the element of said another power supply circuit is larger than a variation of a resonance frequency of the piezoelectric transformer.

4. The apparatus according to claim 2, wherein said one power supply circuit and said another power supply circuit include at least either of capacitive elements of capacitances different from each other and resistors of resistance values different from each other.

5. The apparatus according to claim 1, wherein an output side of the piezoelectric transformer in said one power supply circuit is not connected to an element corresponding to an element connected to an output side of the piezoelectric transformer in said another power supply circuit.

6. The apparatus according to claim 5, wherein the element connected to the output side of the piezoelectric transformer in said another power supply circuit includes at least one of a resistance element and a rectification element.

7. An image forming apparatus comprising:
a power supply apparatus defined in claim 1; and
an image forming unit adapted to form a toner image, said image forming unit using a voltage applied from said power supply apparatus.

8. The apparatus according to claim 7, wherein
each power supply circuit variably controls a driving frequency of a piezoelectric transformer so as to supply a voltage to be output, and
a voltage-controlled oscillator of one power supply circuit is controlled to prevent the driving frequency from coming close to the driving frequency of another power supply circuit in a transient state until the voltage is obtained in said one power supply circuit.

9. The apparatus according to claim 7, wherein
said image forming unit comprises a plurality of image forming units which respectively form toner images in a plurality of colors, and
the plurality of power supply circuits apply power supply voltages to the plurality of image forming units, respectively.

10. The apparatus according to claim 9, wherein when power supply voltages applied to the plurality of image forming units sequentially rise, a voltage-controlled oscillator of one power supply circuit is controlled to prevent a driving frequency from coming close to the driving frequency of another power supply circuit in a transient state until an output in said one power supply circuit rises.

* * * * *